(12) United States Patent
Goos

(10) Patent No.: US 12,172,756 B2
(45) Date of Patent: Dec. 24, 2024

(54) INTEGRATED ELECTRONIC PANEL FOR ON-BOARD VEHICLE EQUIPMENT

(71) Applicant: Safran Cabin Germany GmbH, Herborn (DE)

(72) Inventor: Jens-Patrick Goos, Herborn (DE)

(73) Assignee: Safran Cabin Germany GmbH, Herborn (DE)

( * ) Notice: Subject to any disclaimer, the term of this patent is extended or adjusted under 35 U.S.C. 154(b) by 338 days.

(21) Appl. No.: 17/740,118

(22) Filed: May 9, 2022

(65) Prior Publication Data

US 2023/0356844 A1 Nov. 9, 2023

(51) Int. Cl.
*G05B 19/409* (2006.01)
*B64D 11/04* (2006.01)
*G05B 19/4155* (2006.01)
*H01H 13/70* (2006.01)

(52) U.S. Cl.
CPC .......... *B64D 11/04* (2013.01); *G05B 19/4155* (2013.01); *H01H 13/70* (2013.01); *G05B 19/409* (2013.01); *G05B 2219/36152* (2013.01)

(58) Field of Classification Search
CPC .................................................. G05B 19/409
See application file for complete search history.

(56) References Cited

U.S. PATENT DOCUMENTS 6,419,120 B1 * 7/2002 Bertone ............... A47J 31/401
222/129.4
9,840,329 B2 * 12/2017 Godecker .............. B64D 11/04
9,963,240 B2 5/2018 Boodaghians et al.
10,793,293 B2 10/2020 Christian et al.
(Continued)

FOREIGN PATENT DOCUMENTS

CN 203026125 U * 6/2013
EP 3757006 A1 * 12/2020 ......... B60R 16/0238
(Continued)

OTHER PUBLICATIONS

International Application No. PCT/IB2023/054465, International Search Report and Written Opinion mailed on Aug. 8, 2023, 12 pages.

*Primary Examiner* — Suresh Suryawanshi
(74) *Attorney, Agent, or Firm* — Kilpatrick Townsend & Stockton LLP

(57) ABSTRACT

Described is an integrated electronic control system including keypad with a keypad connector, one or more galley inserts controllable by the keypad; and a control board couplable with the keypad and the galley insert. The control board includes a first connector configured to removably and electrically couple with the keypad connector, a second connector configured to removably and electrically couple with a galley insert connector, and a processor implementing a plurality of control functions related to multiple galley inserts. The processor is configured to receive an input command related to a connected galley insert from the keypad, and generate a control signal, via a control function associated with the galley insert using the input command, to control the galley insert. Further, feedback from the galley insert is received, and based on the feedback, the keypad is configured to indicate a status of the galley insert.

13 Claims, 22 Drawing Sheets

(56) References Cited

U.S. PATENT DOCUMENTS

| | | | |
|---|---|---|---|
| 2010/0243800 A1* | 9/2010 | Koschberg | B64D 11/04 244/118.5 |
| 2013/0047630 A1 | 2/2013 | Lu et al. | |
| 2013/0248652 A1* | 9/2013 | Godecker | B64D 11/04 244/118.5 |
| 2018/0281958 A1 | 10/2018 | Bajorat et al. | |

FOREIGN PATENT DOCUMENTS

| | | | |
|---|---|---|---|
| WO | WO-2013136286 A2 * | 9/2013 | B60R 16/033 |
| WO | WO-2018140659 A1 * | 8/2018 | |

* cited by examiner

INTEGRATED ELECTRONIC PANEL FOR ON-BOARD VEHICLE EQUIPMENT

FIELD OF THE DISCLOSURE

Embodiments of the present disclosure relate generally to an electrical control panel for on-board vehicle equipment.

BACKGROUND

A number of components on-board a passenger transportation vehicle, such as an aircraft, require electrical power for their activation. Many of these components are separate from the electrical components that are actually required to run the vehicle (i.e., the navigation system, fuel gauges, flight controls, and hydraulic systems). For example, aircraft also have catering equipment, heating/cooling systems, lavatories, power seats, water heaters, and other components that require power as well. Specific components that may require external power include, but are not limited to, trash compactors, ovens and warming compartments (e.g., steam oven, convection oven, bun warmer), optional dish washer, freezer, refrigerator, coffee and espresso makers, water heaters (for tea), air chillers and chilled compartments, galley waste disposal, heated or cooled bar carts/trolleys, surface cleaning, area heaters, cabin ventilation, independent ventilation, area or spot lights (e.g., cabin lights and/or reading lights for passenger seats), water supply, water line heating to prevent freezing, charging stations for passenger electronics, electrical sockets, emergency lighting, and combinations thereof.

In an aircraft galley, an electrical control panel controls a galley insert. However, one concern is that the existing electrical interfaces are such that button of the control panel are hardwired to a particular galley insert. So, a particular electrical interface can control only a single galley insert, such as a chiller. Currently, there is no intelligent system with programmable control panel for controlling operation and distributing power to individual galley inserts (GAINs). It is desirable to improve electrical control panels for improving interchangeability, maintenance, and controlling operation of different electrical components on an aircraft.

SUMMARY

According to some embodiments, an integrated electrical control system for on-board vehicle electrical equipment is described. Specific embodiments relate to an integrated electrical control system for use on-board an aircraft. The integrated panel includes a control board, a keypad removably coupleable to the control board, at least one galley insert removably coupleable to the control board and controllable by the keypad. The keypad includes plurality of control elements to control a insert and a keypad connector to connect to the control board. The at least one galley insert includes a galley insert connector to connect to the control board and is controllable by a control element of the keypad.

The control board includes a first connector configured to removably and electrically couple with the keypad connector of the keypad, a second connector configured to removably and electrically couple with the galley insert connector of the at least one galley insert, and one or more processors implementing a plurality of control functions related to multiple galley inserts. The one or more processors is in communication with the keypad and the at least one galley insert when the control board, the keypad and the at least one galley insert are electrically coupled to each other by the first and second connectors, respectively. The one or more processors is configured to receive an input command associated with the at least one galley insert from a control element of the plurality of control elements of the keypad, generate a control signal, via a control function associated with the at least one galley insert using the input command, to control the at least one galley insert, receive feedback from the at least one galley insert; and configure, based on the feedback, the keypad to indicate a status of the at least one galley insert.

The present disclosure describes an improved integrated electronic control system for configuring of the electrical control panel in a vehicle, such as an aircraft galley, for example. The integrated electronic control system described herein is a modular design that facilitates flexibility of operating any electrical insert from the same electronic panel. The integrated electronic control system may include one or more control board(s) and a keypad removably and electrically coupled to the control board(s) to control one or more galley inserts. The control board(s) can also be removably and electrically coupled to one or more galley insert. The integrated electronic control system herein facilitates easy to replace electrical components in case of malfunction, upgrade, servicing, and program various control commands via software rather than hardwiring each electrical insert to an electronic panel. In a specific example, the integrated electronic control system herein can be configured for controlling galley inserts. The functions of the galley inserts that may be controlled include, but not limited to, turning power on and off; turning lights on, off, and dimming; turning galley components on and off; managing temperatures; managing any other parameters of a components that would be controlled by a single control board or keypad, or any other appropriate features.

A control board can control several galley inserts including, but not limited to, one or more of the following electrical equipment: trash compactor; bun warmer/warming components; dishwasher; convection oven; steam oven; freezer/refrigerator; air chiller/chilled compartments; coffee/espresso maker; water heater; galley waste disposal unit; heated bar cart; cooled bar cart; trolley; surface cleaning; heating/cooling system; independent ventilation; lighting system; water supply; water line heating; power supply for laptop, phone charging, and other personal powered systems; or any combination thereof. The control board can be configured to not only control electrical equipment located inside a galley area, but also electrical equipment located outside the galley area that can be electrically coupled to the control board. For example, electrical equipment located outside the galley area may be heater or cooler in a lavatory, lights in the lavatory, in-flight entertainment units (IFUs), etc. which can be coupled to the control board by cable harness extending from the lavatory area or other area to be controlled, to the area where the control board is installed. The control board is typically installed in the galley area, but it should be understood that the control board can be installed elsewhere on-board the vehicle, such as anywhere control of components is desired. Embodiments are useful in relation to the field of aerospace and ground transportation vehicles, particularly to improve flexibility in use of galley inserts, maintenance, functionality of the galley inserts and the regulation of the power demand and delivery.

In the present disclosure, a keypad assembly comprising a display panel replaces a typical toggle switch panel. This keypad assembly contains lighting elements that can create custom controls on the display panel. In this way, the hardware of the keypad assembly can create control inputs on the display that can enable the controlling of any piece of electrical insert equipment. Such keypad assembly can be coupled to the galley control panel to configure the integrated electronic control system thereby creating a modular toggle switch panel that can be used with any piece of electrical insert equipment.

In some embodiments, the keypad assembly comprising the display panel enables the controlling of all galley functions. The hardware system stays the same, no matter the required function. The function is specified through pin programming (e.g., software code) as opposing to hard wiring (e.g., electrical wires and connecting hardware).

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Currently, the electrical equipment (e.g., galley inserts) on-board an aircraft are hardwired to a toggle switch panel. This toggle switch panel contains buttons, knobs, etc. that are used to control the functions of a single electrical insert equipment. This makes toggle switch panels unique to the electrical insert equipment that they are controlling. A coffee maker toggle switch panel cannot control an oven toggle switch panel, for example.

Figure 1:
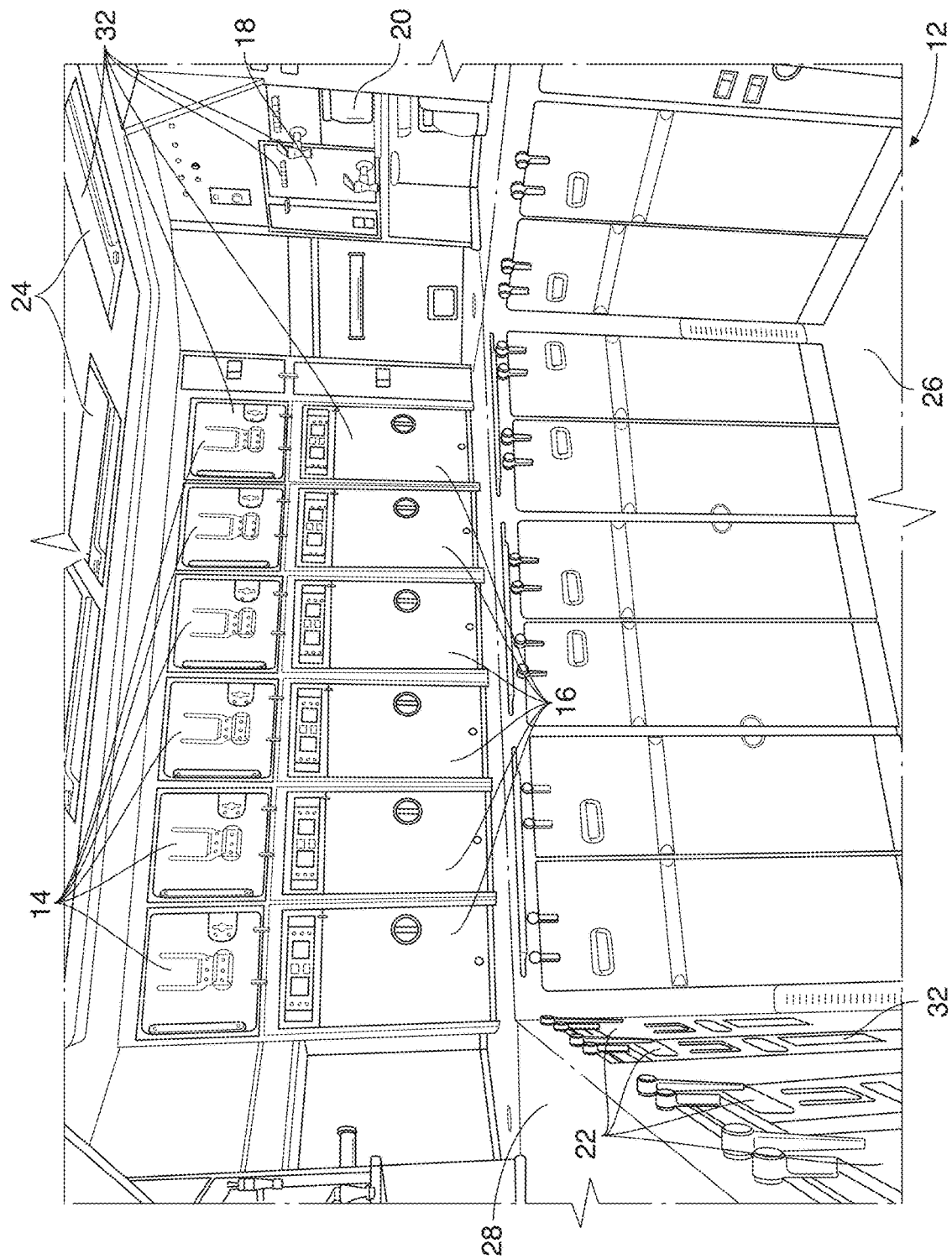
FIG. 1 is a perspective view of a galley of an aircraft, according to some embodiments of the present disclosure.

FIG. 1 illustrates a non-limiting embodiment of a galley 12 configured to be controlled by an integrated control system, as discussed herein. As shown in FIG. 1, the galley 12 may include one or more galley inserts (GAINs) 32, such as bun warmers 14, convection ovens 16, water heaters 18, beverage makers 20, heated or cooled bar carts/trolleys 22, area lights 24. In other embodiments, the galley 12 may include additional GAINs 32, such as steam ovens, optional dish washers, freezers, refrigerators, air chillers and chilled compartments, galley waste disposal unit, and any other electrical equipment. It is also possible to use the disclosed control system to monitor and control other components throughout the vehicle, such as in-flight entertainment units. All of the components listed and provided for exemplary purposes only. It should be understood that the control system described may be used to control any appropriate component on board an aircraft.

Figure 2:
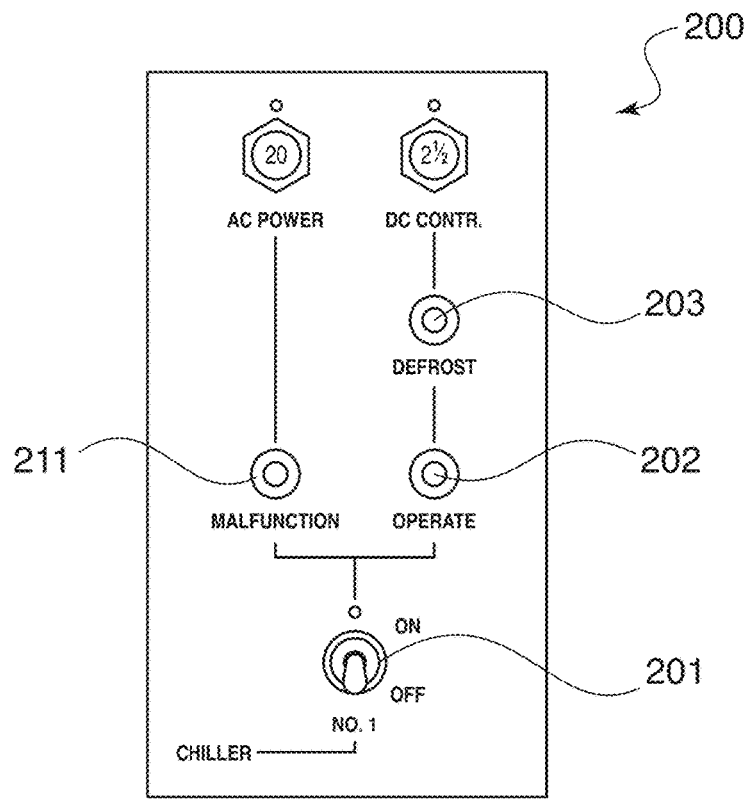
FIG. 2 is a switch board of a chiller of a galley, according to some embodiments of the present disclosure.

The power and control arrangement of the aircraft galley typically includes a series of individual appliances connected to a main power supply, each appliance individually operated by its own controls, power switch, etc. For example, FIG. 2 is a typical switch board of a chiller of a galley. As shown, an existing toggle switch panel 200 for chiller includes an ON/OFF button 201, an operating mode button 202, a defrost button 203, and a malfunction button 211. Each of these buttons are particularly hardwired to the control operation of the chiller.

Figure 3:
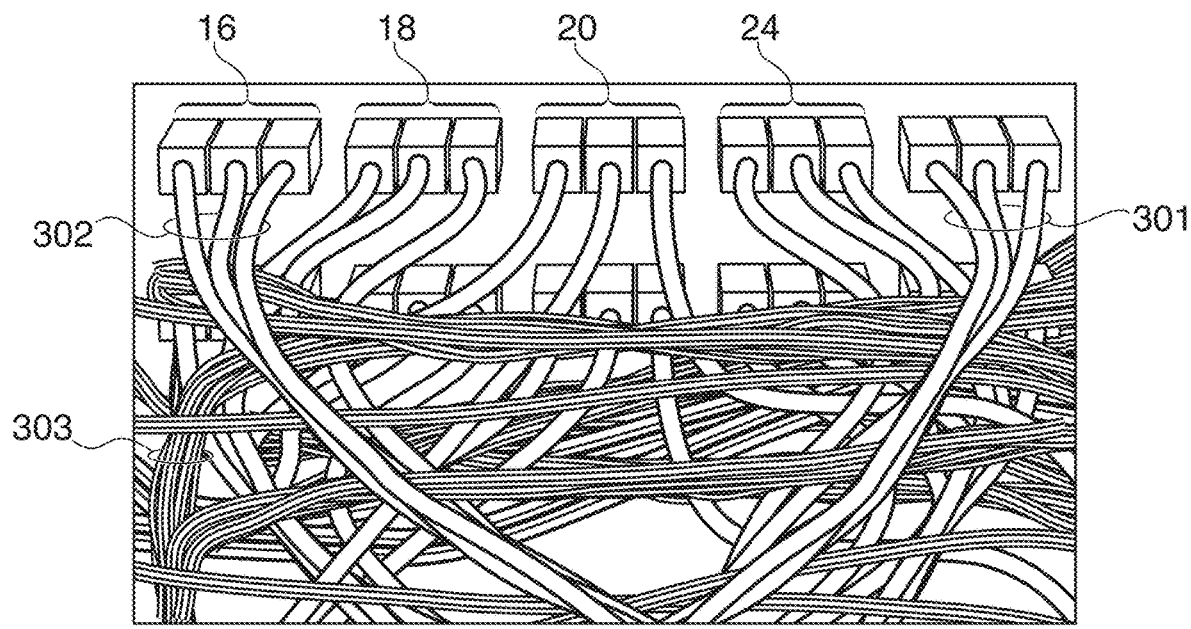
FIG. 3 illustrates hardwired electrical connections connected to several galley inserts of FIG. 1, according to some embodiments of the present disclosure.

FIG. 3 illustrates typical hardwired electrical connections to control several galley inserts of FIG. 1. Multiple cable harnesses (e.g., 301, 302, 303) are connected to the galley inserts (e.g., 16, 18, 20, 24, etc.). For example, a first cable harness 301 may be dedicated to control chiller, a second cable harness may be dedicated to control coffee maker, a third cable harness may be dedicated to control area lights. A cable harness, also known as a wire harness, or wiring, is an assembly of electrical wires which transmit signals or electrical power. The cables are bound together by a durable material such as rubber, vinyl, electrical tape, conduit, a weave of extruded string, or a combination thereof. The cable harness is coupled with interfaces to establish electrical connection with a particular insert.

Many of the electrical appliances in the equipment suite of FIG. 1 include individual operating controls or user interfaces. For example, each of the ovens can include an oven interface, and each of the coffee makers can include a coffee maker interface. Similarly, the water boiler can include a boiler interface, and the trash compactor can include a compactor interface, and so forth. A control panel can include control switches for those appliances that do not have dedicated user interfaces, such as the air chiller and the lights. A circuit breaker panel positioned adjacent to the control panel can include a plurality of circuit breakers corresponding to each of the foregoing electrical appliances.

There are several disadvantages of the existing hardwired toggle switches approach. For example, the hardwiring of every function of an insert is time-consuming. The toggle switch panels require many unique parts which can lead to higher procurement costs. Replacing components is difficult, time consuming, and can require significant manual effort. The wire bundles take up a lot of space and are heavy, and space and weight are primary concerns on board vehicles, such as aircraft.

The present disclosure addresses several limitations of the aforementioned toggle switch panel by way of an integrated electronic control system (e.g., discussed with respect to FIGS. 4-14 below). The disclosed integrated electronic control system (e.g., a system 10 in FIG. 4) facilitates control of functions through control boards (e.g., 400 in FIG. 4), also referred as printed circuit boards (PCBs) that comprises connections points with the board rather than directly to the insert. As such, the functions can be controlled through pin programming, which offers a software approach to solving a hardware problem (e.g., hardwired controls).

The control board (e.g., 400 in FIG. 4) disclosed herein allows each of various electrical appliances, such as galley inserts, to be connected and controlled by a user interface (e.g., a keypad 500 in FIG. 4) to facilitate control of the appliances via a display screen. Accordingly, incorporation of the display screen can eliminate the need for the toggle switch panel 200 of FIG. 2. Advantageously, the space normally utilized by each of toggle switch panels 200 can now be used for additional storage space or for additional galley appliances. The present disclosure explains various concepts herein with reference to galley inserts, by way of example, without limiting the scope to galley inserts. A person of ordinary skill in the art can envision implementing the present disclosure for other electrical equipment in an aircraft, a bus, train, marine vessel, or other passenger transportation vehicle, or other applications where hardwired controls may be prevalent and for which flexibility in control and placement may be desired.

Figure 4:
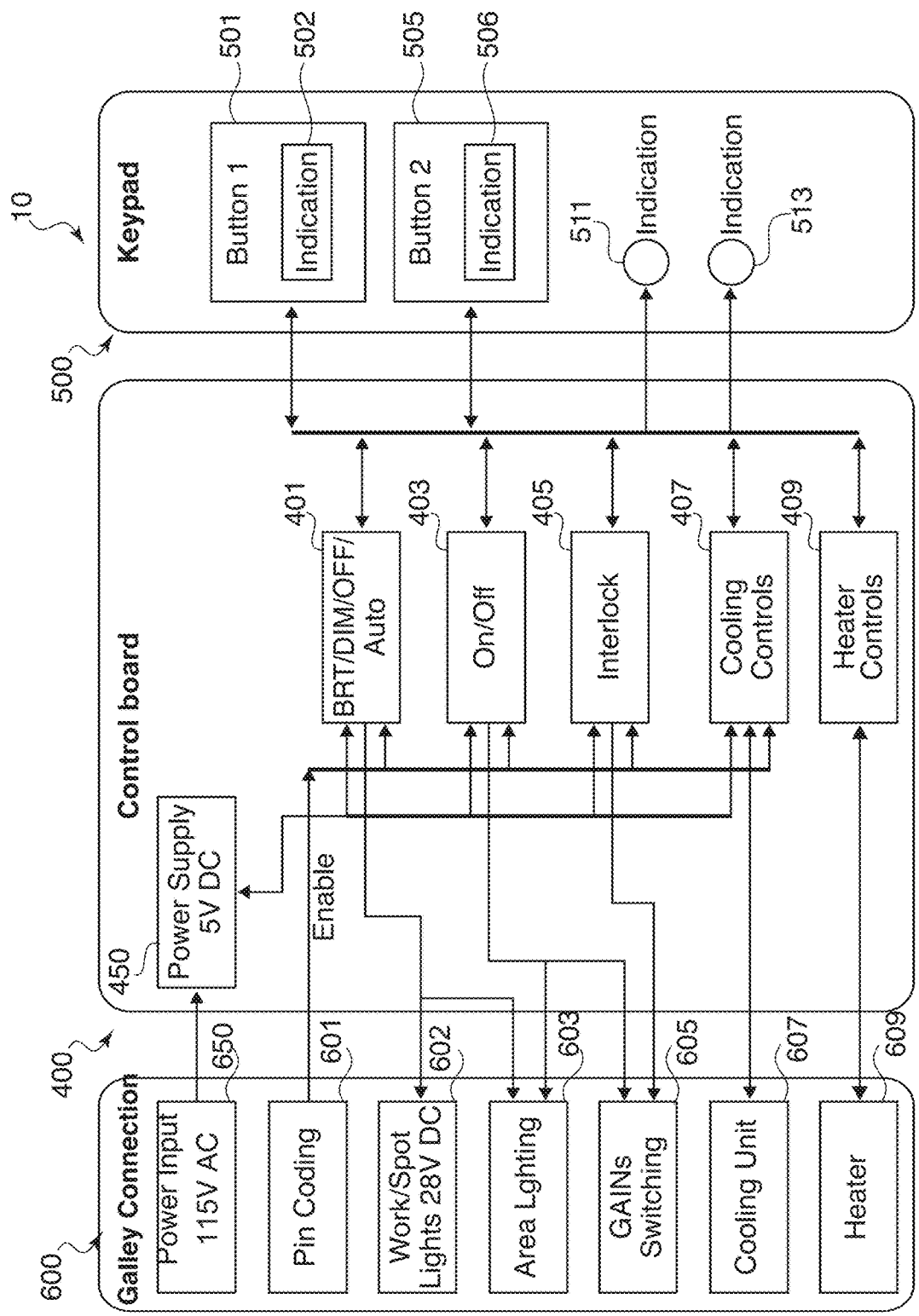
FIG. 4 illustrates a block diagram of an integrated electronic control system, according to some embodiments of the present disclosure.

FIG. 4 illustrates an example of a block diagram of an integrated electronic control system 10, according to some embodiments of the present disclosure. The integrated electronic control system 10 includes an control board 400, a keypad 500, and one or more galley connections 600.

In some embodiments, each galley insert may include a galley connection 600. Each galley connection 600 can be attached to a single control board 400. However, the single control board 400 implements control functions of different galley inserts (e.g., coffee maker, cooler, heater, etc.). As such, even if one galley insert (e.g., coffee maker) is disconnected and another galley insert is connected (e.g., a cooler is connected), the same control board 400 can be used to control the another galley insert (e.g., the cooler). In some embodiments, multiple control boards 400 may be assembled in a housing and each control board 400 may be coupled to one galley insert. For example, a first control board can be connected to a coffee maker, a second control board 400 may be connected to a cooler, a third control board 400 may be connected to a heater, etc. The keypad 500 may be attached to multiple control boards 400 to facilitate control of any galley insert from the same keypad 500.

The control board 400 may be powered by a power source 650 (e.g., 115V AC at 360-800 Hz, or 28V DC). The control board may include its own transformer or rectifier to be protected by a circuit breaker. Any other form of power may be used, such as AC power, aircraft power, and so forth. The control board 400 can be implemented on a control board or a PCB, which can be referred as the control board 400. The keypad 500 may be include another control board configured to activate or display control elements and indicator on a display panel to facilitate control of the galley inserts.

The control board 400 comprises several functions related to one or more galley inserts. For example, the control board 400 can be configured to provide two-way communication between the galley inserts as well as the keypad. In some embodiments, the control board 400 can be configured to receive an input command associated with the at least one galley insert from the keypad. The input signal may be provided to a control function associated with the at least one galley insert to generate a control signal to control the at least one galley insert. For example, the control function may be "on" "off" "raise temperature" "lower temperature" For example, a galley insert (e.g., a cooler) may be connected to the control board 400. The control board 400 may receive an "on" command from the keypad 500. Then, the control board 400 generates a signal to turn on and send the turn on signal to the galley insert (e.g., the cooler). When the control board 400 receives a "lower temperature" (e.g., by 2 degrees) command from the keypad 500, the control board 400 generate a control signal and send the control signal to the galley insert (e.g., the cooler) to lower the temperature (e.g., by 2 degrees) so that the galley insert can operate until the temperature is lowered.

Furthermore, the control board 400 can be configured to receive feedback from the at least one galley insert. For example, the feedback can indicate an operation mode, usage data of the galley insert, temperature, faulty or operating status, etc. The feedback may be "high vibration" "duration of use" "power consumed" "high temperature" "leakage fault" etc. Based on the feedback, the control board 400 may indicate appropriate condition on the keypad 500 so that a user can take appropriate action (e.g., turn off the insert). In some embodiments, the feedback may be stored by the control board 400 in a memory or database to be retrieved by a computer for predictive maintenance, monitoring a life of an insert, other data analysis to improve reliability and availability of the inserts In some embodiments, the feedback may be received from one or more sensors (not shown) of the galley insert. In some embodiments, based on the feedback from the galley insert, the keypad can be configured to indicate a status or feedback information of the at least one galley insert. For example, the keypad 500 could display a blinking light to indicate that a problem is detected and needs immediate attention, a green light to indicate power on or the insert is active and operating properly, a red light to indicate a fault (e.g., temperature too high, leakage detected, etc.), a yellow light to indicate a warning (e.g., temperature may exceed an undesired value), a blue light to indicate the insert is plugged in but inactive or not currently in use, etc.

In some embodiments, the control board 400 may include a first function 401 corresponding to controlling lights, a second function 403 corresponding to controlling of ON/OFF of a galley insert, a third function 405 corresponding to controlling interlock between galley inserts, a fourth function 407 may relate cooling controls of a cooling unit of a galley, a fifth function 409 may relate to heater controls of a heating unit of a galley, or other functions. Depending on a galley insert to be controlled, one or more functions of the control board 400 may be activated. These exemplary functions are provided for ease of description only and are not intended to be limiting. Furthermore, the control board 400 may include power domains to supply power 450 (e.g., 5V DC) to enable operation of the one or more functions implemented thereon. In one embodiments, shown in FIG. 5A, a control board power supply may be received from the power source 650 and the power domain can control an amount of power to be supplied during operation of the control board 400. The modular structure of the control board 400 and the keypad 500 facilitates operation of the inserts as "plug and play." In other words, the galley inserts need not be hardwired to a particular toggle switch. Instead, any galley insert can be connected to the control board 400 and the keypad 500 can be connected to the control board 400 to control any galley insert. For example, a coffee maker or a cooler can be connected to the control board 400. The control board 400 can recognize the type of insert connected, then activate corresponding controls on the keypad 500 so that the connected insert can be controlled.

Figure 5A:
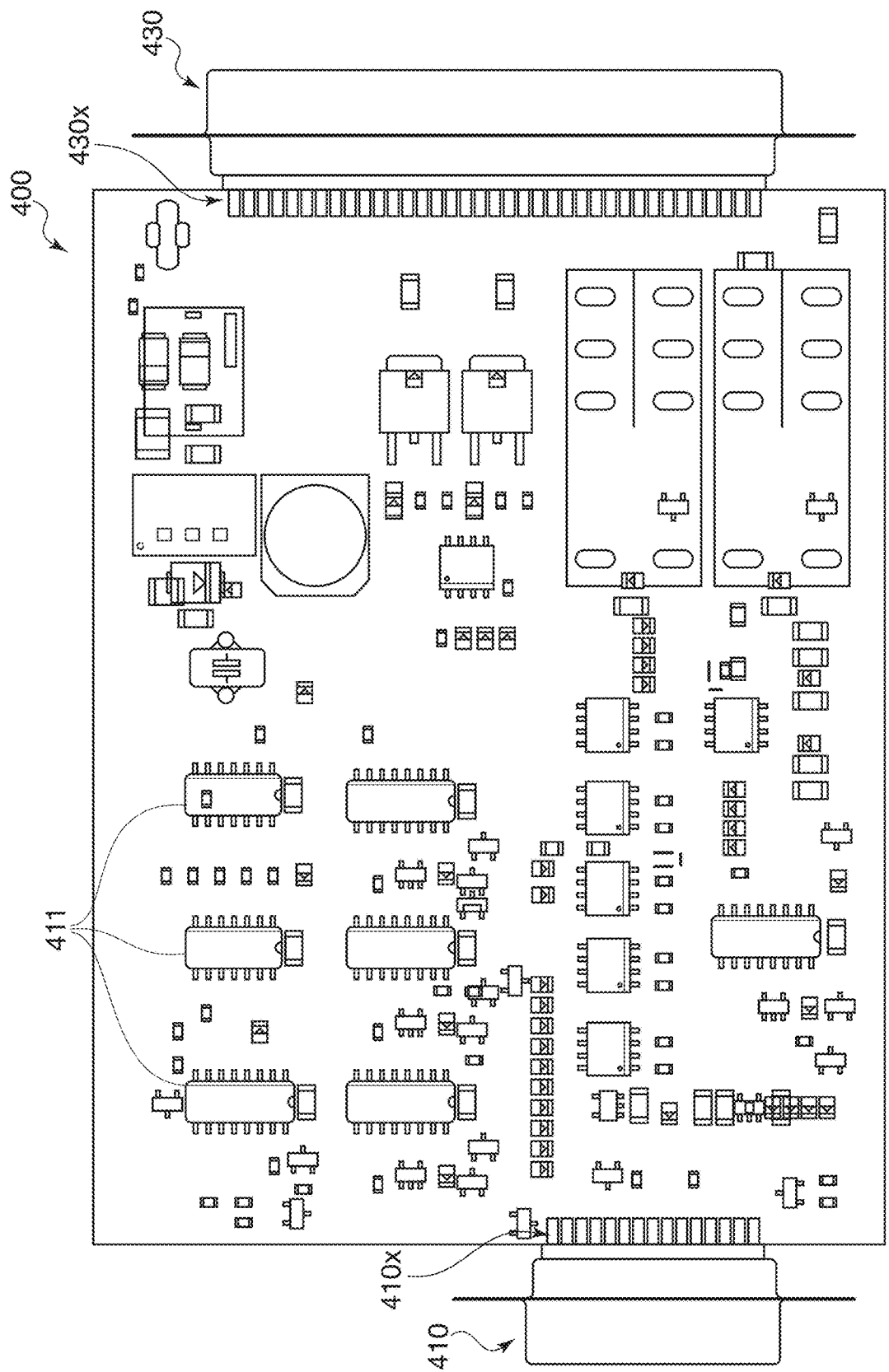
FIGS. 5A-5B illustrate electronic control board configurations for the integrated electronic control system of FIG. 4, according to some embodiments of the present disclosure.

In some embodiments, the keypad 500 comprises control elements and indicators. The control elements serve as inputs to control one or more galley insert through functions implemented on the control board 400. In some embodiments, the control elements may be button, touch sensitive element implemented on a touch screen, or other input means. In one embodiment, as shown in FIG. 5A, the keypad 500 may be configured to include a first button 501 with an associated first indicator 502, a second button 505 with an associated second indicator 506, a third indicator 511, and a fourth indicator 512, and so forth. As an example, the first button 501 may be an ON/OFF button to start/stop a galley insert. The second button 505 may be used to further control different levels (e.g., high, low, dim, bright, etc.) of operating a particular insert. The third indicator 511 may serve as a visual indicator of a status (e.g., malfunction or working) of the galley insert. The fourth indicator 512 may serve as a visual indicator of a status (e.g., a warning symbol) of the galley insert. Depending on the galley insert being used, the keypad 500 may activate corresponding control elements and/or indicators. Examples of keypad controller and display of control elements is further discussed in detail with respect to FIGS. 7A-9B.

In some embodiments, the galley connections 600 may include several connections configured to electrically connect one or more galley inserts to the control board 400. For example, the galley connections 600 includes a power input connection from the power supply 650 to supply power to the control board 400, a pin coding connection 601 for pin programming, a first galley insert connection 602 (e.g., for a work light/spot light), a second galley insert connection 603 (e.g., for a galley area lighting), a third galley insert connection 605 (e.g., for GAINS switching), a fourth galley insert connection 607 (e.g., for a cooling unit), and a fifth galley insert connection 609 (e.g., for a heater).

The control board 400 can include the functionalities of several appliances or galley inserts. A particular galley insert and associated control functions may be enabled based on a PIN/WIRE coding 601 that can be identified by the control board 400. For each galley insert, one control board 400 and one keypad 500 may be used. In some embodiments, the keypad can be configured per aircraft related design compliance. For example, the keypad 500 may include a maximum of two switches with indication LED's, and two additional indication red, green, blue (RGB) LED's.

FIG. 5A illustrates an example implementation (e.g., PCB) of the control board 400 of the integrated electronic control system 10 of FIG. 4, according to some embodiments of the present disclosure. As shown, the control board 400 includes one or more processors 411 that may be configured to implement several function related to controlling inserts (e.g., functions 401, 403, 405, 407, and 409 in FIG. 4) discussed herein. Of all the functions, the control board 400 is configured to select functions associated with a particular insert to be used. In some embodiments, one side of the control board 400 includes keypad connector interface 410 (e.g., individually referred as 410a, 410b, 410c) to connect a keypad connector 510 coupled to a keypad 500, and other side of the control board 400 includes insert connector interface 430 to connect an insert connector 610 (see FIG. 13A) coupled to a cable harness, which electrically connects to the insert.

The keypad connector interface 410 and the insert connector interface 430 facilitates removably coupling of the keypad 500 and the insert connector 610 to the control board 400. Thus, if there are any faults in a control board 400, it can be replaced with a new control board 400 by simply removing the keypad 500 and the insert connector 610 of the cable harness without having to rewire the controls of each insert. Similarly, if there are any faults in a keypad 500, it can be replaced with a new keypad 500 without having to rewire controls of each inserts. Such a modular design of the integrated electronic control system thus solves the issues related to hardwired controls of the inserts with toggle switch board (e.g., shown in FIGS. 2 and 3).

In some the keypad connector interface 410 is coupled to a first set of electrical connections 410x to send or receive communication signals between the control board 400 and the keypad 500.

In some embodiments, the insert connector interface 430 is coupled to a second set of electrical connections 430X to send or receive communication signal between the control board 400 and an insert. In the example shown, the insert connector interface 430 can be a single interface configured to receive a power signal from a power source and insert signals from the insert. For example, the power signals may be supply or remove power to the control board. The insert signals can be signal related to control functions (e.g., dim, bright, lower temperature, increase heat, etc.) of an insert (e.g., an area light, cooler, heater, etc.). The insert connector 610 is configured corresponding to the insert connector interface 430. When connected, the insert connector 610 conveys power signal to power the control board 400, and also conveys insert related signals to control a connected insert. However, the present disclosure is not limited to a particular connector configuration. For example, the insert connector interface 430 may be configured to convey insert related signals, while a separate connector may be provided for power signals, as shown in FIG. 5A.

Figure 5B:
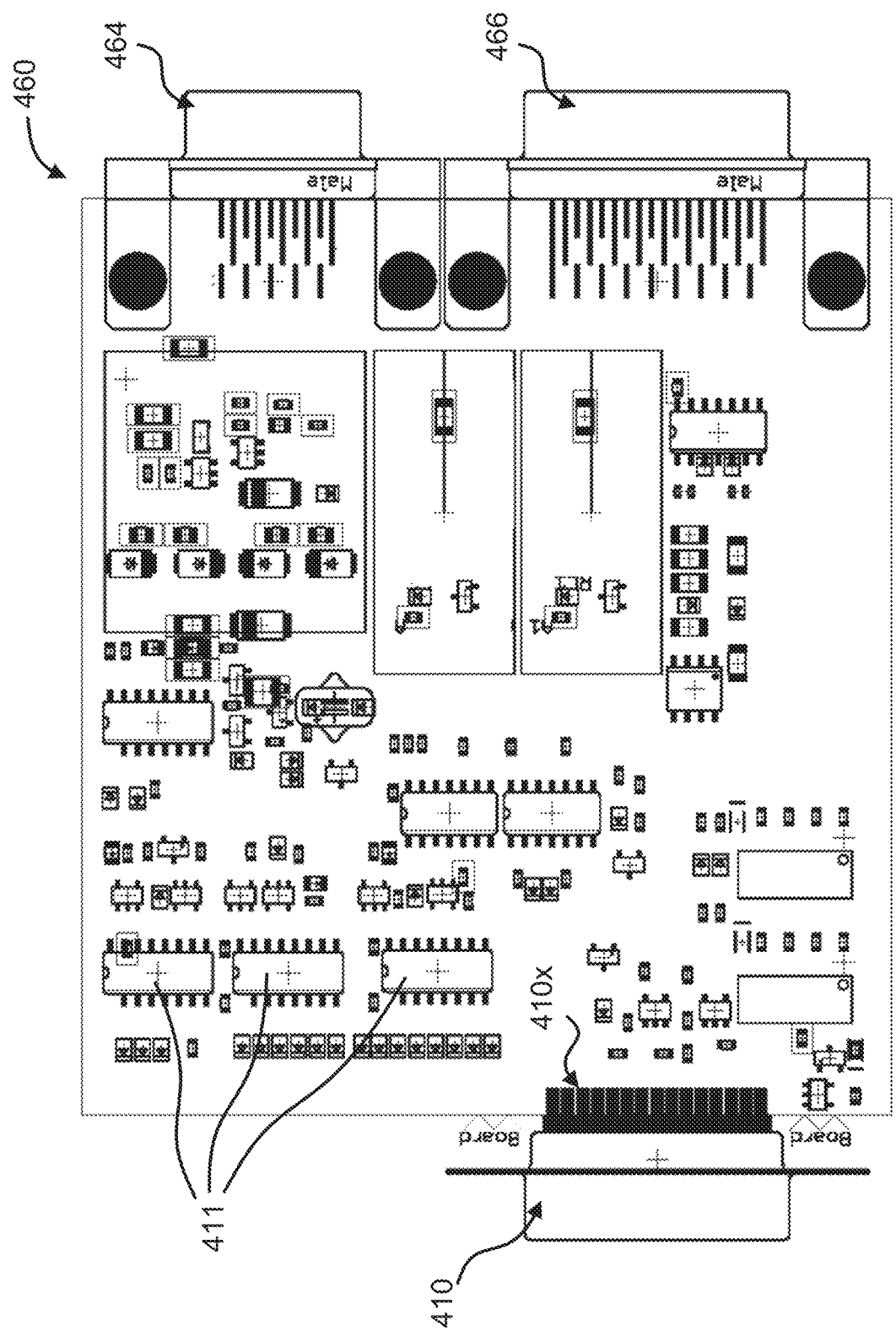

FIG. 5B shows another example of a control board 460 implementing the same functions as the control board 400. For example, the control board 460 includes processors 411 implementing same functions as the control board 400. The control board 460 further includes the keypad connector interface 410, a power connector interface 464, and an insert signal connector 466. The power connector interface 464 can be connected to a power source via a power cable to supply power to the control board 460. The insert signal interface 466 can be connected to an insert to convey signals between the control board 460 and an insert. As the power connector interface 464 is separated from the insert signal interface 466, signal interference between the power signals and the insert signal can be prevented.

Figure 6A:
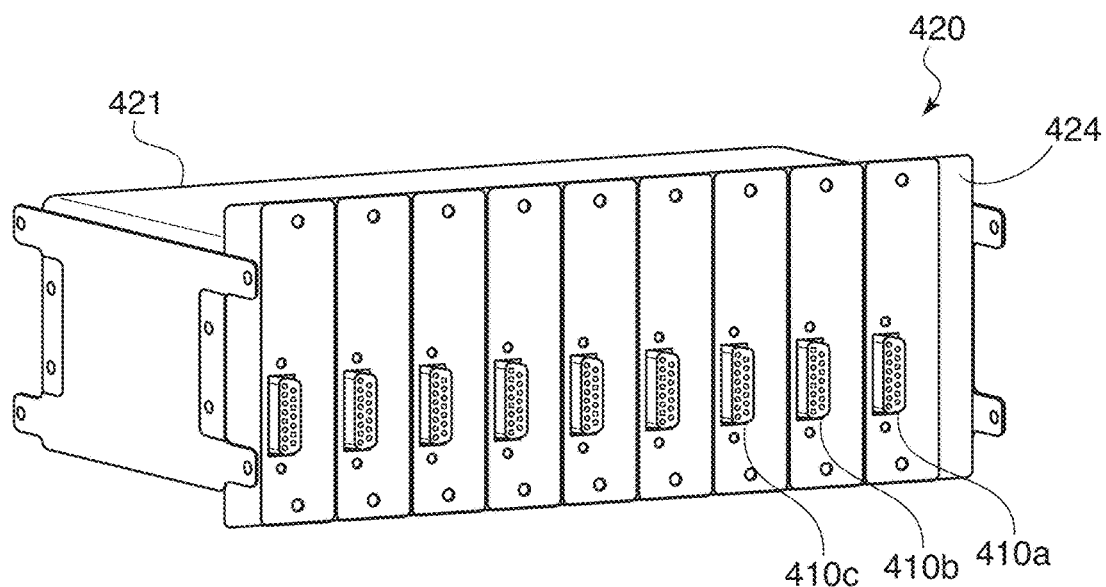
FIG. 6A illustrates a front perspective view of a control module assembly with keypad connectors, the control module assembly houses multiple electronic control board of FIG. 5A, according to some embodiments of the present disclosure.

FIG. 6A illustrates a front perspective view of a control module assembly 420, according to some embodiments of the present disclosure. The control module assembly 420 includes a housing 421 and the keypad connector interfaces 410a, 410b, 410c, etc. disposed at a first side 424. In some embodiments, the control module assembly 420 houses multiple electronic control boards 400 (see FIGS. 5 and 13), each of which implement functions related to multiple galley inserts. A keypad 500 may be electrically coupled to one of the control board via the keypad connector interfaces 410a, 410b, or 410c to operate one or more galley inserts. In some embodiments, the keypad 500 may be coupled via a pigtail wires extending between the keypad connector interface 410 and the keypad connector 510 (see FIG. 13A).

Figure 6B:
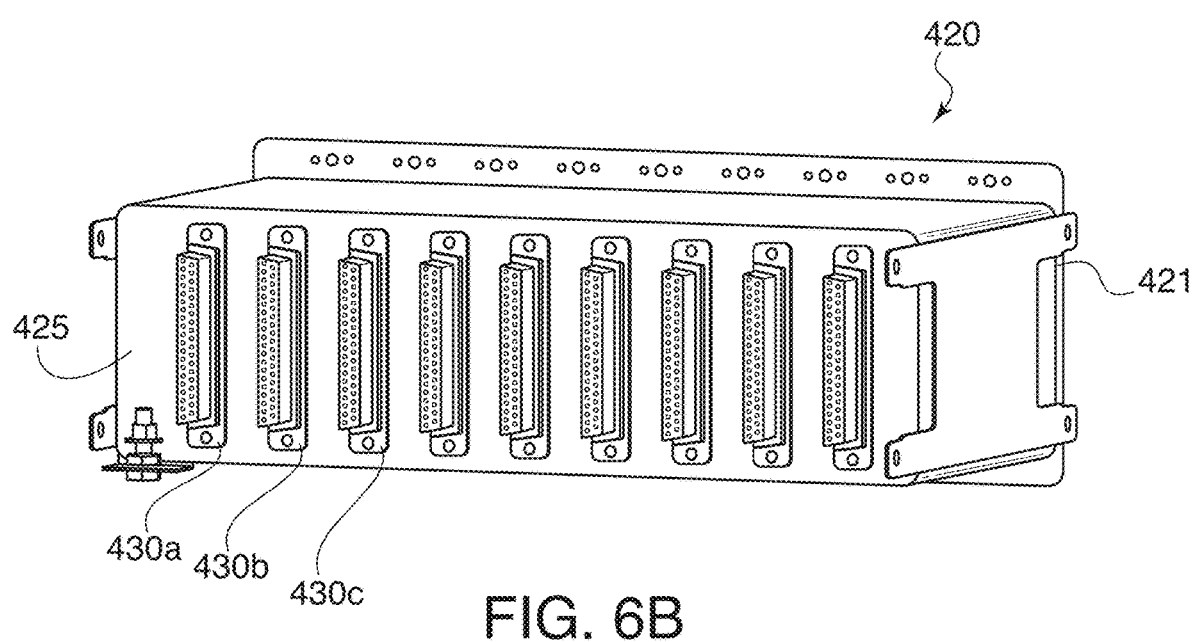
FIG. 6B illustrates a rear perspective view of the control module assembly with connectors associated with galley inserts, the control module assembly houses multiple electronic control board of FIG. 5A, according to some embodiments of the present disclosure.

At a rear side 425, as shown in FIG. 6B, the control module assembly 420 includes insert connector interfaces 430a, 430b, 430c, etc. associated with galley inserts, according to some embodiments of the present disclosure. Accordingly, any galley insert may be connected to one of the control board 400 within the control module assembly 420. The control board 400 can identify the type of galley insert and activate corresponding control functions (e.g., functions 401, 403, 405, 407, and/or 409 in FIG. 4).

The shape and size of the control module assembly 420 may be relatively smaller than an existing control board with simpler connections with inserts. In some embodiments, one or more control module assemblies may be placed within the galley at different locations without limiting the type of insert to be controlled. Also, keypads 500 can be attached to any of the control module assembly 420 at any location within the galley thereby providing freedom of placement of the inserts independent of the location of the keypad 500. For example, if a coffee maker is at a top of the galley and a trash compactor is at a floor of the galley, the control module assembly 420 and the keypad 500 can be placed at a single location in the galley (e.g., at waist or eye level) facilitating easy access to control the coffee maker and the trash compactor from the single keypad 500.

In some embodiments, the keypad connector interfaces 410a-410c and insert connector interfaces 430a-430c may be configured to provide electrical protection against inverse-polarity and electrostatic discharge by bonding of the control boards.

Figure 6C:
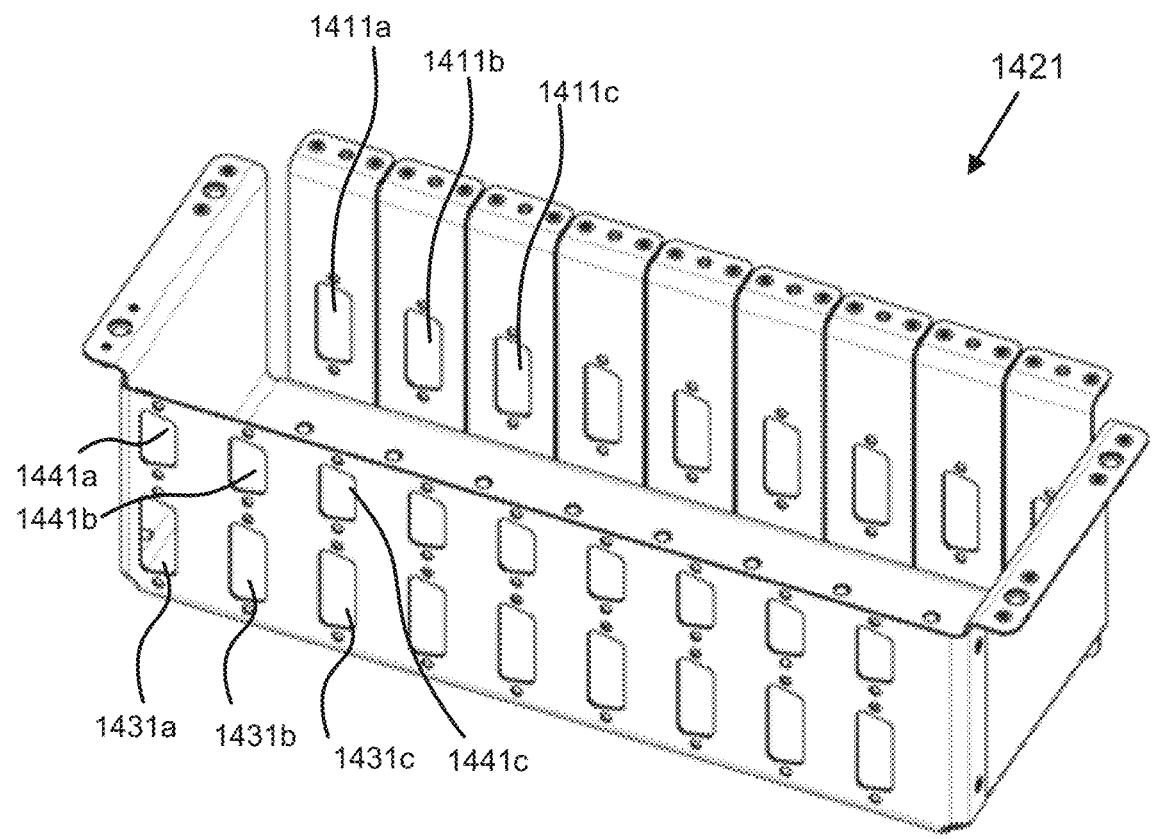
FIG. 6C illustrates a perspective view of an housing to receive a plurality of control boards of FIG. 5B, according to some embodiments of the present disclosure.

FIG. 6C illustrates a perspective view of another example housing 1421 to receive a plurality of control boards 460, according to some embodiments of the present disclosure. The housing 1421 can have substantial same construction as the housing 421, except for being adapted to facilitate receiving of the multiple control boards 460. The housing 1421 comprises cutouts corresponding to the keypad connector interface 410, the power connector interface 464, and the insert signal interface 466 of the control board 460. For example, each of keypad connector cutouts 1411a, 1411b, 1411b correspond to the keypad connector interface 410 of the control board 460. Each of insert connector cutouts 1431a, 1431b, 1431c correspond to the insert signal connector interface 466 of the control board 460. Each of power connector cutouts 1441a, 1441b, 1441c correspond to the power signal connector interface 464 of the control board 460.

Figure 6D:
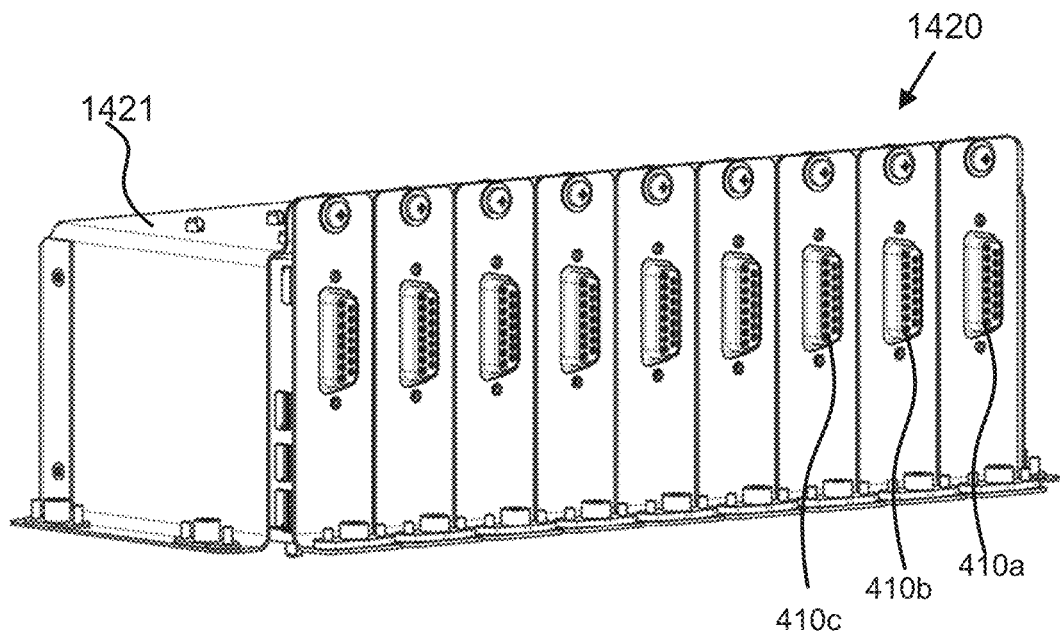
FIG. 6D and FIG. 6E illustrate a control module comprising multiple control boards of FIG. 5B inside the housing of FIG. 6C.
Figure 6E:
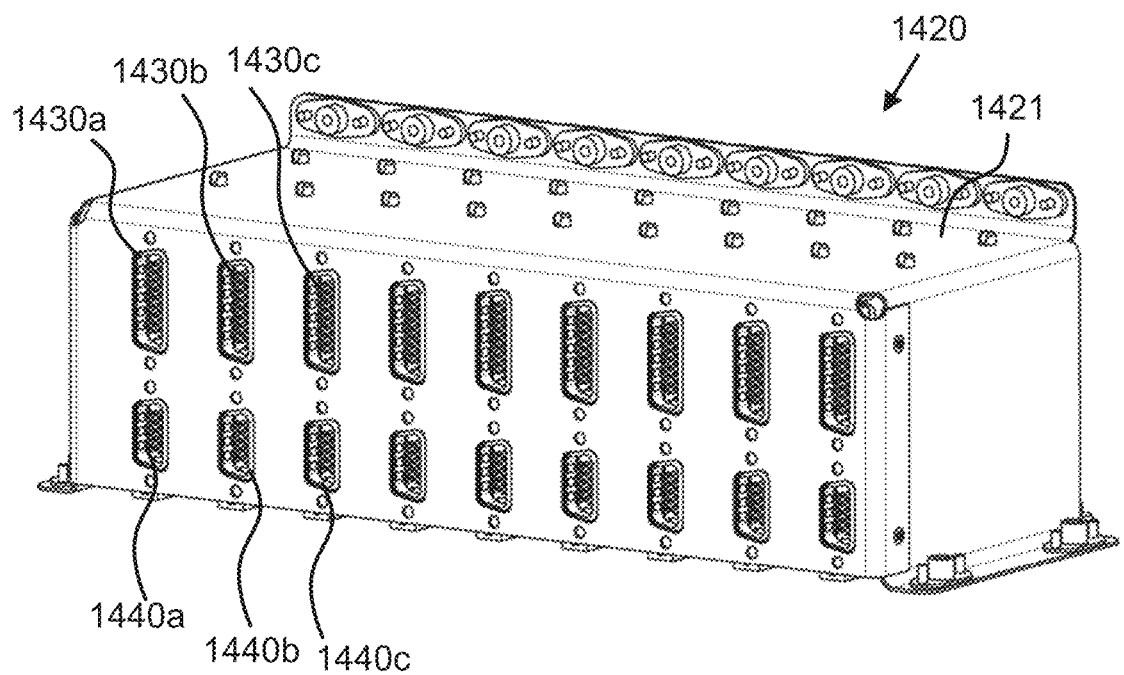

FIG. 6D and FIG. 6E illustrates a control module 1420 comprising multiple control boards 460 (not labelled) inside the housing 1421. As shown in FIG. 6D, the keypad connector interfaces 410a, 410b, 410c can be accessed on a first side. While the insert signal interfaces 1430a, 1430b, 1430c, and the power signal interfaces 1440a, 1440b, 1440c can be accessed on a second side, as shown in FIG. 6E.

Figure 7A:
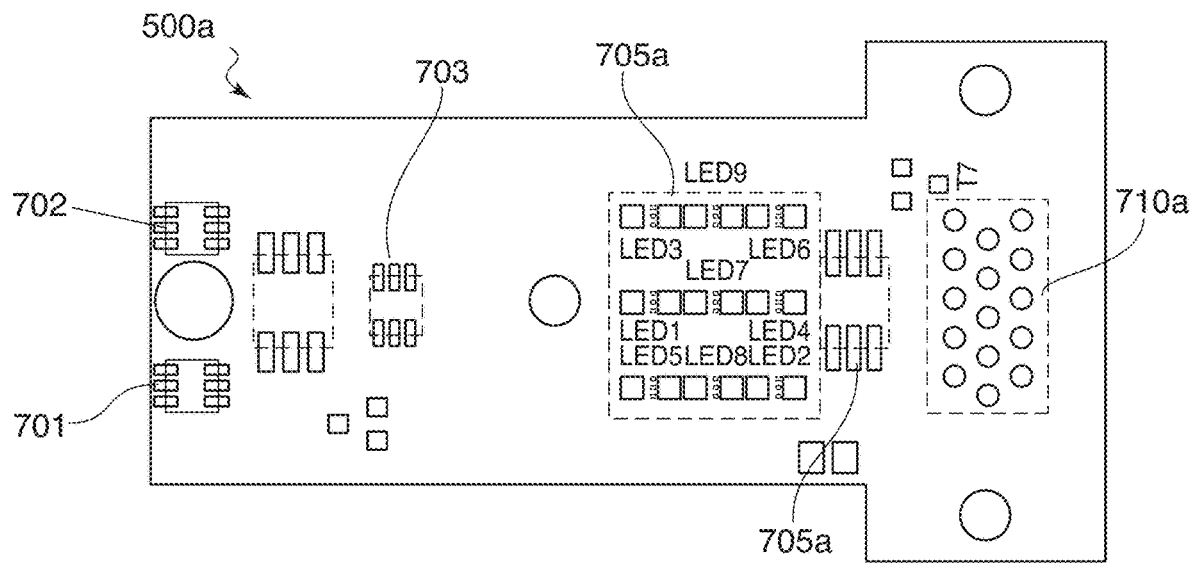
FIG. 7A illustrates front side of an keypad control board of the integrated electronic control system of FIG. 4, according to some embodiments of the present disclosure.
Figure 7B:
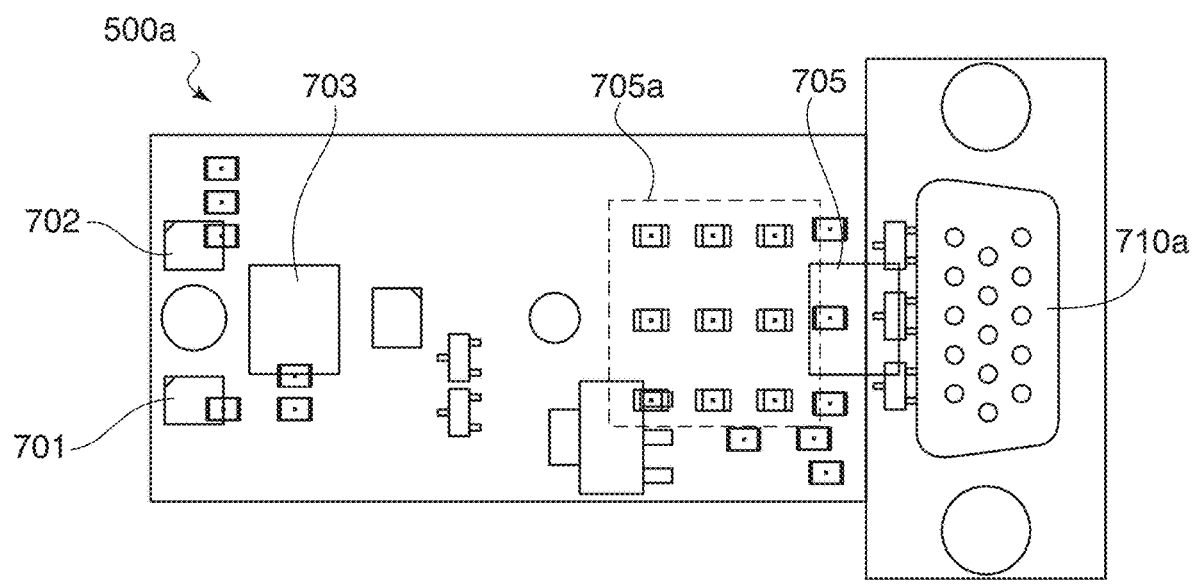
FIG. 7B illustrates back side of an keypad control board of the integrated electronic control system of FIG. 4, according to some embodiments of the present disclosure.
Figure 7C:
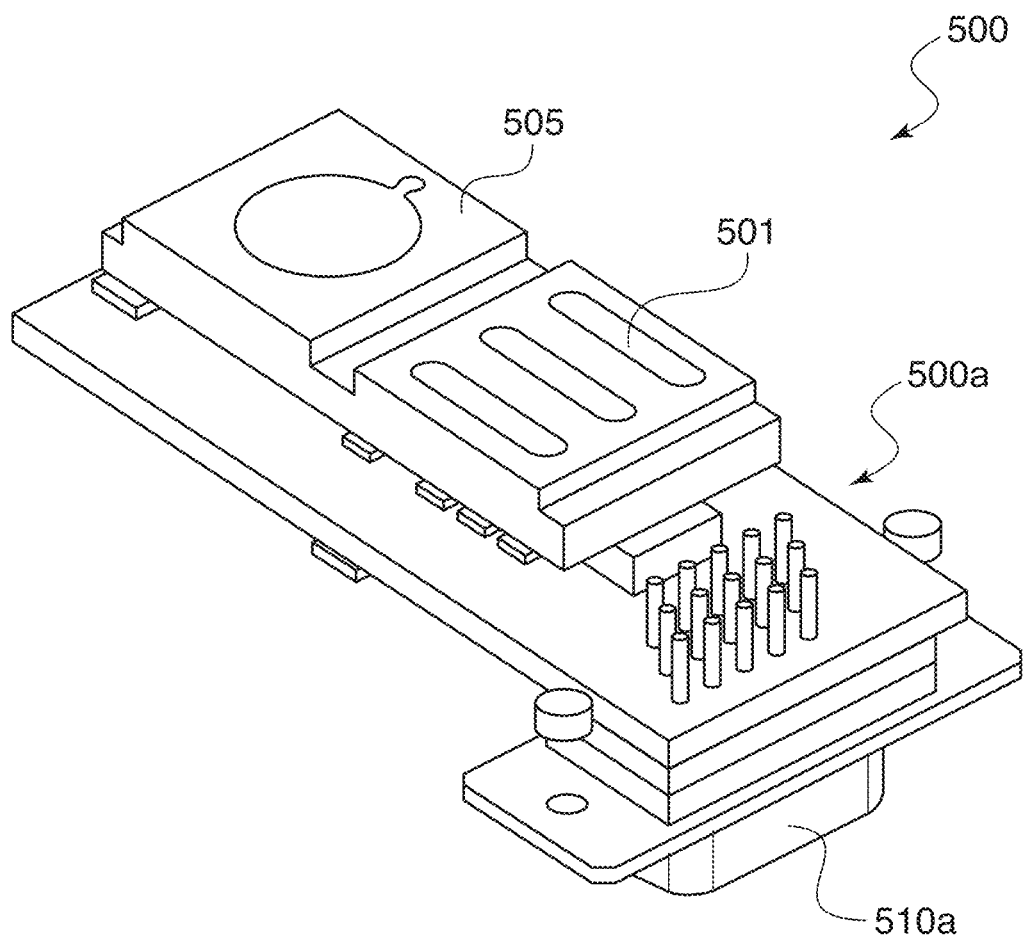
FIG. 7C illustrates a perspective view of the keypad control board of FIGS. 7A-7B coupled with control elements (e.g., buttons) coupled to the front side and a connector coupled to the back side, according to some embodiments of the present disclosure.

FIGS. 7A, 7B, and 7C illustrates a front side view, a back side view, and a perspective view, respectively, of an example instance of a keypad control board 500a of the keypad 500 of FIG. 4, according to some embodiments of the present disclosure. FIG. 7C further shows that the keypad control board 500a can be coupled with control elements (e.g., buttons) at a front side and a connector is coupled to a back side, according to some embodiments of the present disclosure.

In the example shown in FIGS. 7A-7B, the keypad control board 500a comprises a first button portion 703 with contact pads configured to receive inputs via the first button 501, a second button portion 705 with contact pads configured to receive inputs via the second button 505, an indicator or display circuit portion 705a associated with indicators (e.g., 502 and 506 in FIG. 4) the second button 505, a first indicator circuit portion 701 corresponding to the third indicator 511 (in FIG. 4), and a second indicator circuit portion 702 corresponding to the fourth indicator 512 (in FIG. 4). In some embodiments, the indicators may be LEDs configured such that each active function (e.g., functions 401, 403, 405, 407, and/or 409) can be indicated by illuminating an LED bar or color. In some embodiments, for all indication colors, the specifications form a manufacturer and/or aircraft compliance documents may be considered. For example, the keypad 500 could display a blinking light to indicate that a problem is detected and needs immediate attention, while a non-blinking green light may be used to indicate power on or the insert is active and operating properly, a non-blinking yellow light to indicate a warning (e.g., temperature may exceed an undesired value), a non-blinking blue light to indicate the insert is plugged in but inactive or not currently in use, etc.

Furthermore, the keypad control board 500a includes a keypad connector portion 710a that facilitates coupling of the keypad connector 510a. The keypad control board 500a can be coupled to the control board 400 via the keypad connector 510a. When coupled, the keypad control board 500a can receive inputs from the control elements (e.g., buttons 501 and 505) which can be further communicated to the control board 400 (e.g., in FIG. 5A) via the keypad connector 510a to execute one or more functions (e.g., functions 401, 403, 405, 407, and/or 409) based on the inputs.

In some embodiments, the keypad control board 500a may be configured to receive, via the control board 400, the feedback from the inserts. For example, the feedback may be "leakage" at the insert. Accordingly, the keypad control board 500a may configure an indicator (e.g., red blinking light) corresponding to the insert and display the indicator on the keypad 500.

Figure 8:
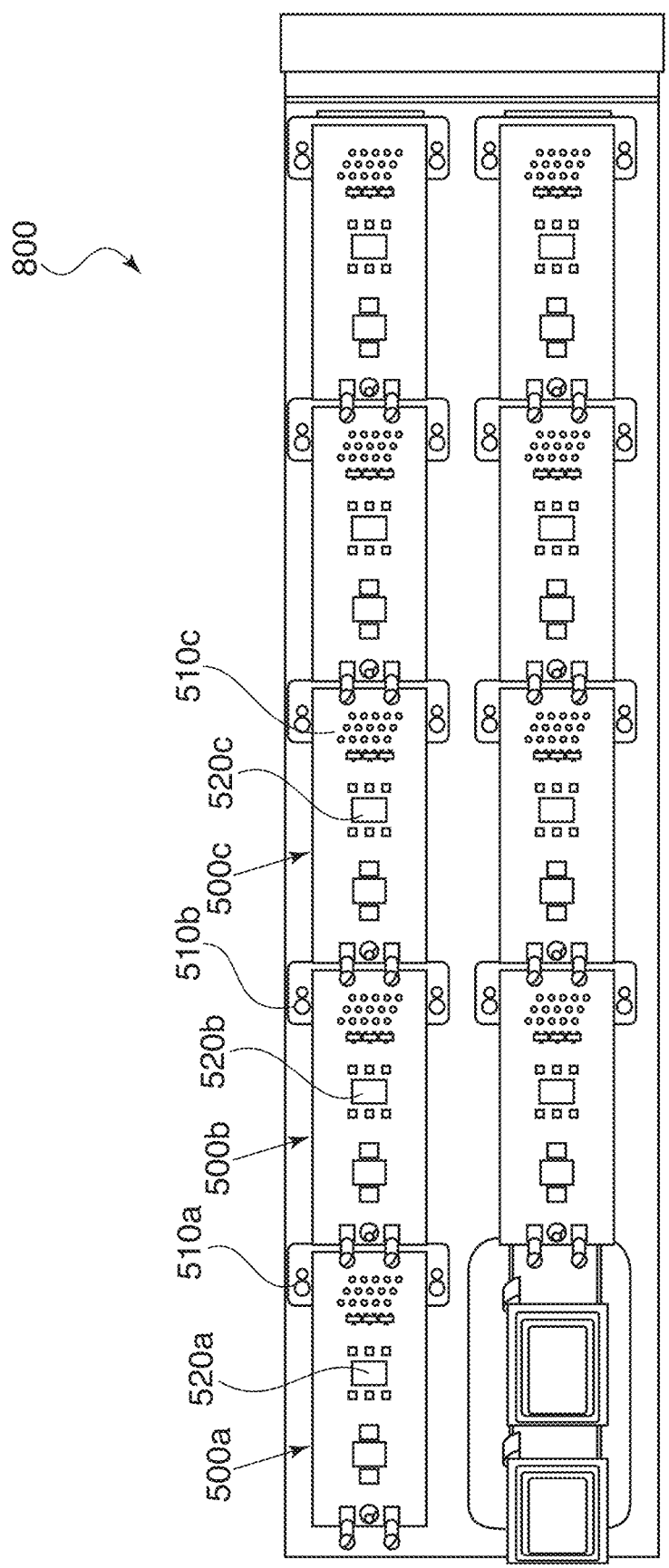
FIG. 8 illustrates an assembly of keypad comprising multiple keypad control boards mechanically coupled to each other, according to some embodiments of the present disclosure.

In some embodiments, several of the keypad control boards 500a, 500a, 500a, etc. can be coupled together to form another keypad 800, as shown in FIG. 8. In some embodiment, the keypad control boards such as 500a-500c can be mechanically coupled to each other to form an array of keypads that can be coupled to the keypad connector interfaces 410a-410c of the control module assembly 420 (shown in FIG. 6A).

Figure 9A:
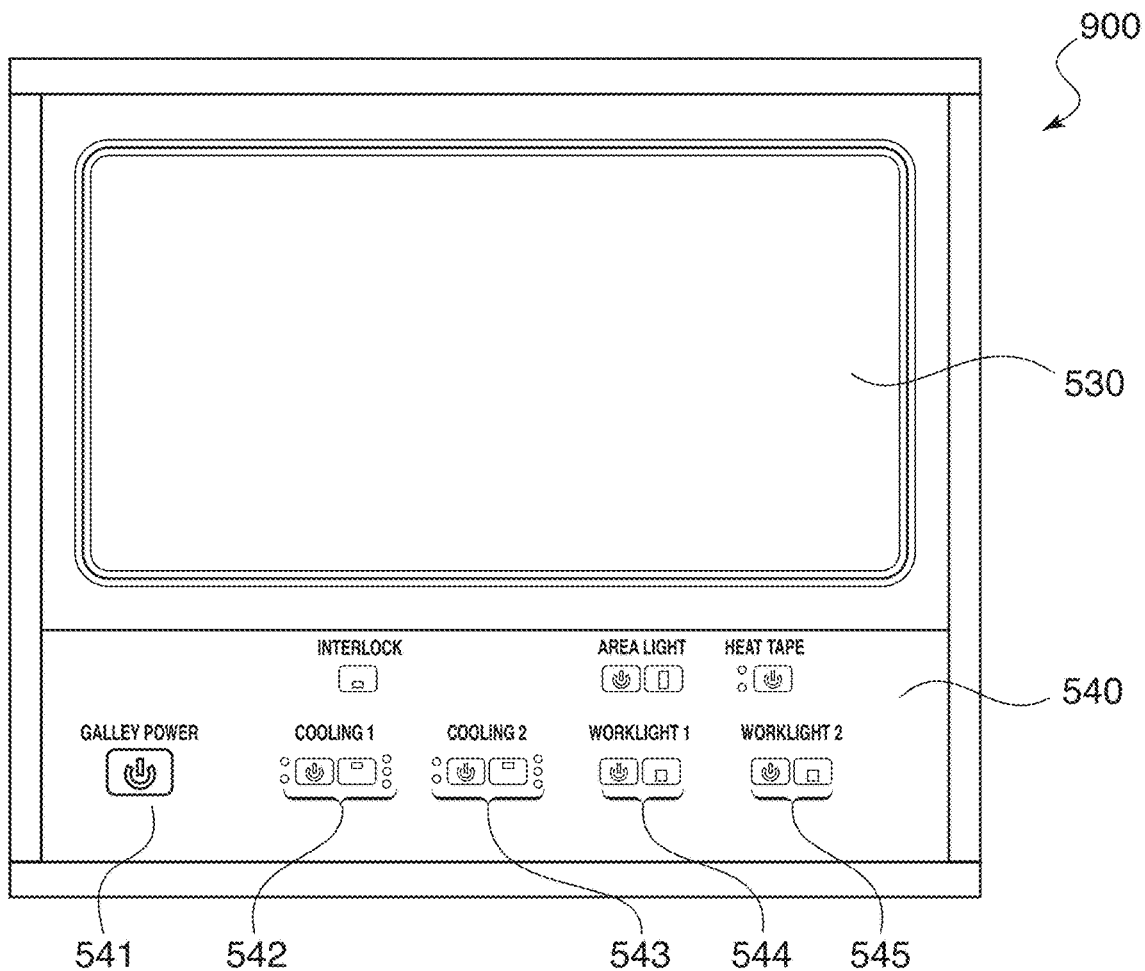
FIG. 9A illustrates a front view of a display plan coupleable to the keypad control board of the integrated electronic control system of FIG. 4, according to some embodiments of the present disclosure.

FIG. 9A illustrates a front view of a display panel 900 attached to a front side of the keypad 500, according to some embodiments of the present disclosure. The display panel 900 includes several control elements and indicators configured grouped per a galley insert to be operated. An example instance of the control elements (e.g., buttons) displayed on the display panel is shown in FIG. 9B.

In one embodiment, shown in FIG. 9A, the display panel 900 may be divided into an upper portion 530 and a lower portion 540. The upper portion 530 may be empty or used to hold a display screen to show a message. The control elements and corresponding indicators may be located in the lower portion 540. For example, a power button 541 may be disposed at a left side when viewing the display panel. The power button 541 is configured to turn ON/OFF power supply to the galley insert via the keypad 500. A first set of control elements and corresponding indicators 542 may be dedicated to a first galley insert (e.g., a first cooling unit). A second set of control elements and corresponding indicators 543 may be dedicated to a second galley insert (e.g., a second cooling unit). A third set of control elements and corresponding indicators 544 may be dedicated to a third galley insert (e.g., a work light). A fourth set of control elements and corresponding indicators 545 may be dedicated to fourth galley insert (e.g., an area light).

Figure 9B:
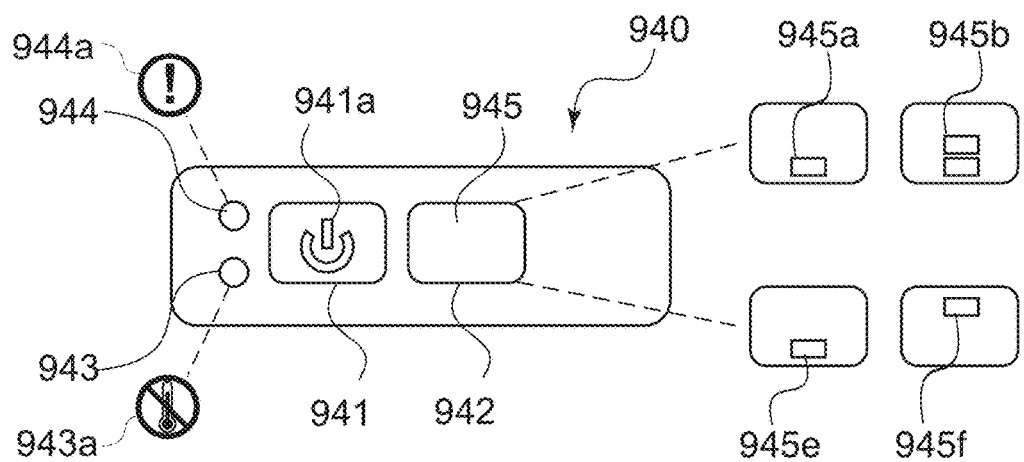
FIG. 9B illustrates a general layout of a keypad displayed on the display panel of FIG. 9A, according to some embodiments of the present disclosure.

FIG. 9B illustrates an example configuration of a set of control elements and indicators 940. For example, one or more control elements and one or more indicators within the set of control elements and indicators 940 may be employed in the first set of control elements and corresponding indicators 542, the second set of control elements and corresponding indicators 543, the third set of control elements and corresponding indicators 544, and/or the fourth set of control elements and corresponding indicators 545 of FIG. 9A. In the set 940, the control elements may include a first button 941 (an example of the first button 501 in FIG. 4) to turn ON or OFF a galley instrument, and a second button 942 (an example of the second button 505 in FIG. 4) to control a function of the galley instrument. On the left side of the first button 941, a third indicator 943 (an example of the third indicator 511 in FIG. 4) and a fourth indicator 944 (an example of the fourth indicator 512 in FIG. 4) may be provided to display an operating status of the galley instrument. It can be understood that the set 940 is presented by way of example and does not limit the scope of the present disclosure. For example, the set 940 may include one, two, or more than two control elements and/or indicators.

In some embodiments, additional indicators may be provided within a button area. For example, a first indicator 941a (an example of the first indicator 502 in FIG. 4) may be provided within the first button 941, and a second indicator (an example of the second indicator 506 in FIG. 4) may be provided within an area 945 of the second button 942. For example, the third indicator 943 may not be illuminated when no galley insert is being used or may be red illuminated if a galley insert is faulty. In some embodiments, the indicators 943, 944, 941a, and indicators in the second button 942 may be activated, deactivated, and/or symbols may be displayed or concealed by the display circuitry. Optionally or in addition, the third indicator 943 may be configured to display a symbol 943a indicating a fault. Similarly, the fourth indicator 944 may not be illuminated when no galley insert is being used or may be yellow illuminated to indicate a warning associated with the galley insert. Optionally or in addition, the fourth indicator 944 may be configured to display another symbol 944a indicating an operation related symbol (e.g., deforst) associated with the galley insert.

Furthermore, the first indicator 941a within the first button 941 may include a symbol corresponding to a power and also include an LED configured to turn blue when a galley instrument is not in use or green to indicate a galley instrument is being used.

The second button 942 may facilitate different modes of operation of a galley instrument, accordingly the indicators in the area 945 can be updated to indicate the mode of operation. For example, a single LED bar 945a may be displayed to indicate a dim light mode of an area light, two LED bars 945b may be displayed to indicate a bright light mode of the area light.

In some embodiments, the second button 942 (or any other button) can be configured for interlocking of GAINs. In another example, a first interlock LED bar 945e or a second interlock LED bar 945f may indicate an interlock status of a first galley insert or a second galley insert, respectively. In this interlock example, the second button 942 can also serve as toggle switch to switch between operation of the first galley instrument and the second galley instrument. Interlocks may be incorporated into the galley power circuit to prevent an overload. Interlocks may be switches that allow flight attendants to make power available to one insert or one group of inserts, but not another insert or another group of inserts. In this way, power is available for only a subset of the galley inserts at any given time, thereby preventing the possibility of exceeding the power allocation.

In an example, switching lights such as work lights, spot lights, area light functions may be implemented on the display panel via the buttons and indicators. For example, for work lights or spot lights, the first button 941 may be configured to switch between ON or OFF with the indicator therein turning blue (OFF) or green (ON), and the second button 942 may be configured to switch between states dim or bright with the indicator therein showing a single bar (dim) or double bars (bright).

In another example, cooling unit functions may be implemented on the display panel via the buttons and indicators. For example, the first button 941 may be configured to turn ON or put the cooling unit in standby. The second button 942 may be configured to select a temperature along with a corresponding indicator within the area 945. Only a lower bar may be lit to indicate a low temperature setting, only a middle bar may be lit to indicate a medium temperature setting, or only a top bar may be lit to indicate a high temperature setting. Also, a yellow indication LED for temperature warning/defrost and a red LED for fault indication may be implemented via indicators 943 and 944. In yet another example, hear unit functions may also be implemented in a similar manner as the cooling unit functions.

Figure 10A:
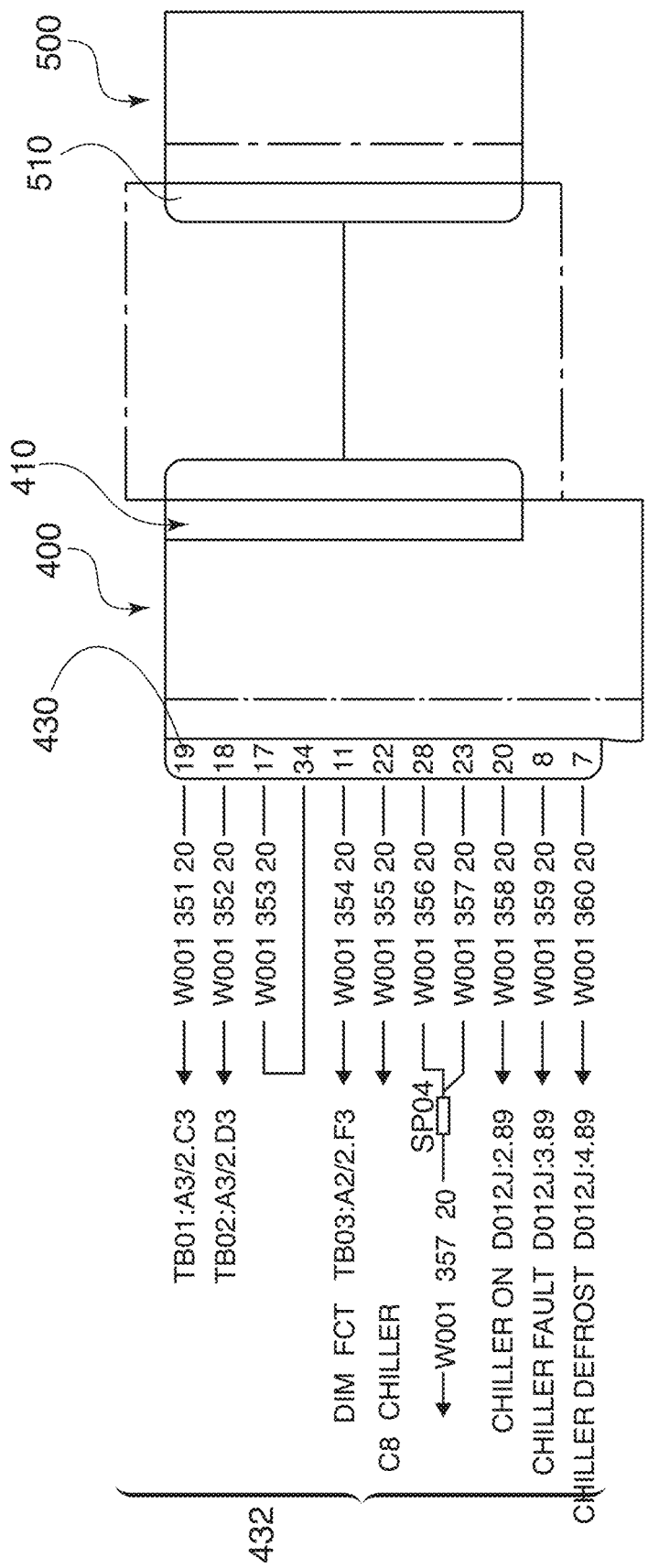
FIG. 10A illustrates a pin diagram of the control board of FIG. 5A that is electrically and mechanically coupled to the keypad and connectors related to a galley insert (e.g., chiller), according to some embodiments of the present disclosure.
Figure 11A:
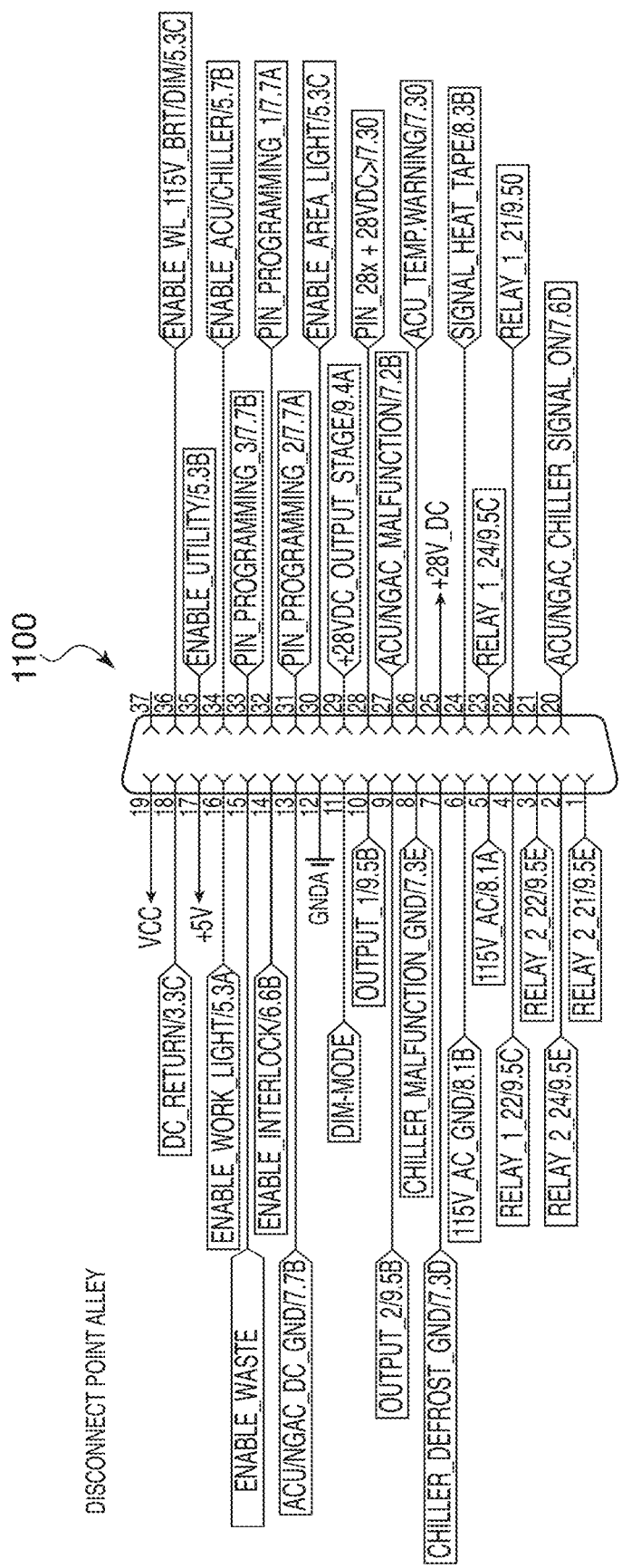
FIG. 11A illustrates a pin configuration of a connector on a galley insert side, according to some embodiments of the present disclosure.
Figure 12A:
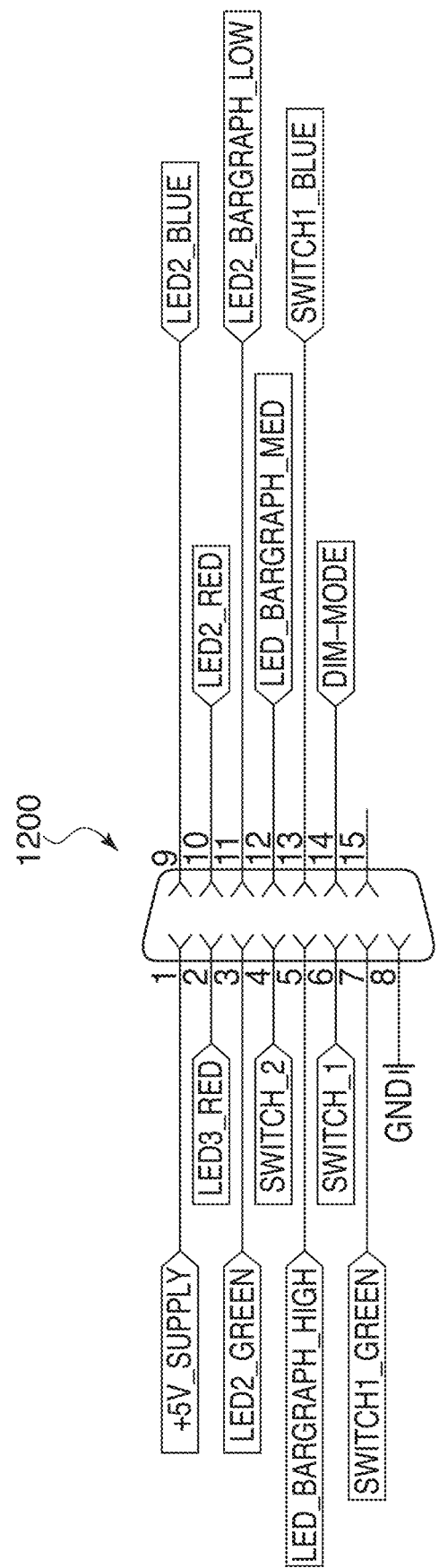
FIG. 12A illustrates a pin configuration of a keypad connector, according to some embodiments of the present disclosure.

FIG. 10A illustrates a pin diagram of the control board 400 electrically and mechanically coupled to the keypad and connectors related to a galley insert (e.g., chiller), according to some embodiments of the present disclosure. As shown, the control board 400 includes an insert connector interface 430 with a connection pin set 432 of a galley insert plug (e.g., having pins as shown in FIG. 11A), and a keypad connector interface 410 coupled with another plug (e.g., having 13 pins as shown in FIG. 12A). The connection pin set 432 is numbered 7, 8, 11, 17, 18, 19, 20, 22, 23, 28, and 34 that are configured for a chiller insert. For example, pin #20 is configured to turn ON the chiller, pin #8 is configured to indicate chiller is in a faulty state, and pin #7 is configured to indicate the chiller is in defrost state. These indicators at pin #s 7, 8, and 20 are further displayed on the keypad 500. The keypad 500 includes a keypad connector 510 configured to couple with the keypad connector interface 410, as discussed herein.

A detailed pin configuration associated a first connector 1100 compatible with a galley connector on a galley insert side is shown in FIG. 11A, and a detailed pin configuration associated with a second connector 1200 corresponding to a keypad connector is shown in FIG. 12A according to some embodiments of the present disclosure. These are provides for exemplary purposes only, and it should be understood that alternate pin configurations are possible and considered within the scope of this disclosure. In the example shown, the first connector 1100 can be directly connected to the insert connector interface 430 comprising a second set of electrical connections 430x on the control board 400 (see FIG. 5A). Further, the first connector 1100 can be electrically coupled with a galley insert. Similarly, the second connector 1200 can be directly connected to the first interface 410 comprising a first set of electrical connections 410x on the control board (see FIG. 5A). Further, the second connector 1200 can electrically couple with a keypad connector (e.g., 510) of a keypad (e.g., 500).

To facilitate function selection by the control board 400, bridging on the first connector 1100 may be done through connection between pin 3 (e.g., supplying +5V DC) and a function pin may be configured according an example pin coding illustrated in table below. For example, when a work/spot light is connected to the control board 400, the pin #5 receives a signal, based on which the control board 400 can recognize the insert is a work/spot light. Once, the insert is recognized, the control board 400 can activate associated control functions of the work/spot light and communicate with the keypad circuitry to activate and display the control elements and indicators related to the work/spot light on the keypad 500.

| Function | Pin# | Signal |
|---|---|---|
| Work/Spot Light 115 V AC | 5 | +5 V DC |
| Utility | 15 | +5 V DC |
| Cooling Unit | 4 | +5 V DC |
| Work-/Spot Light 28 V DC | 5 | +5 V DC |
| Heater | 23 | +5 V DC |
| Interlock | 6 | +5 V DC |
| Area Light | 14 | +5 V DC |
| Keypad LED DIM-Mode | 11 | DC GND |

Figure 10B:
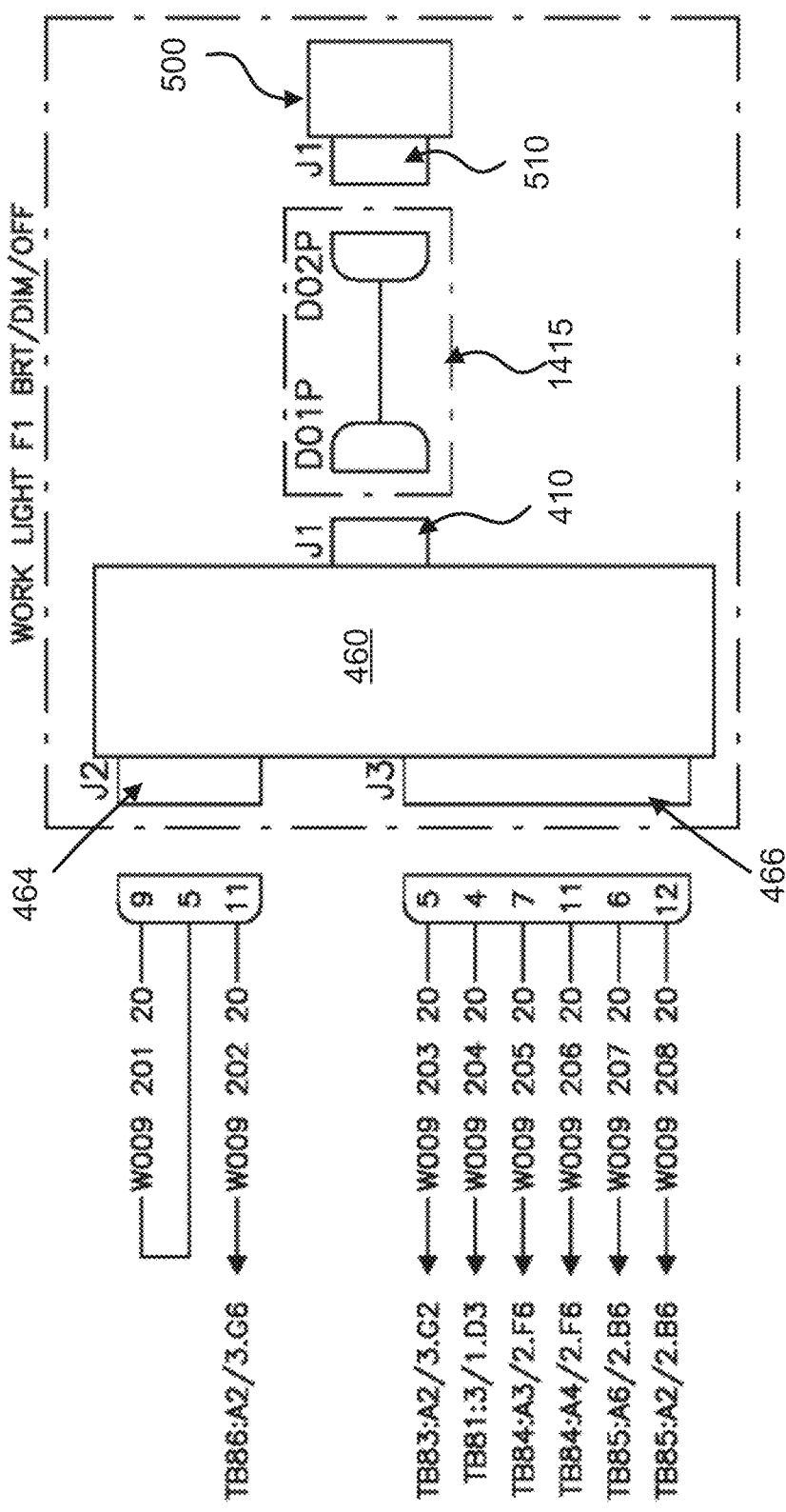
FIG. 10B illustrates a pin diagram of the control board of FIG. 5B that is electrically and mechanically coupled to the keypad and connectors related to a galley insert (e.g., work area), according to some embodiments of the present disclosure.
Figure 11B:
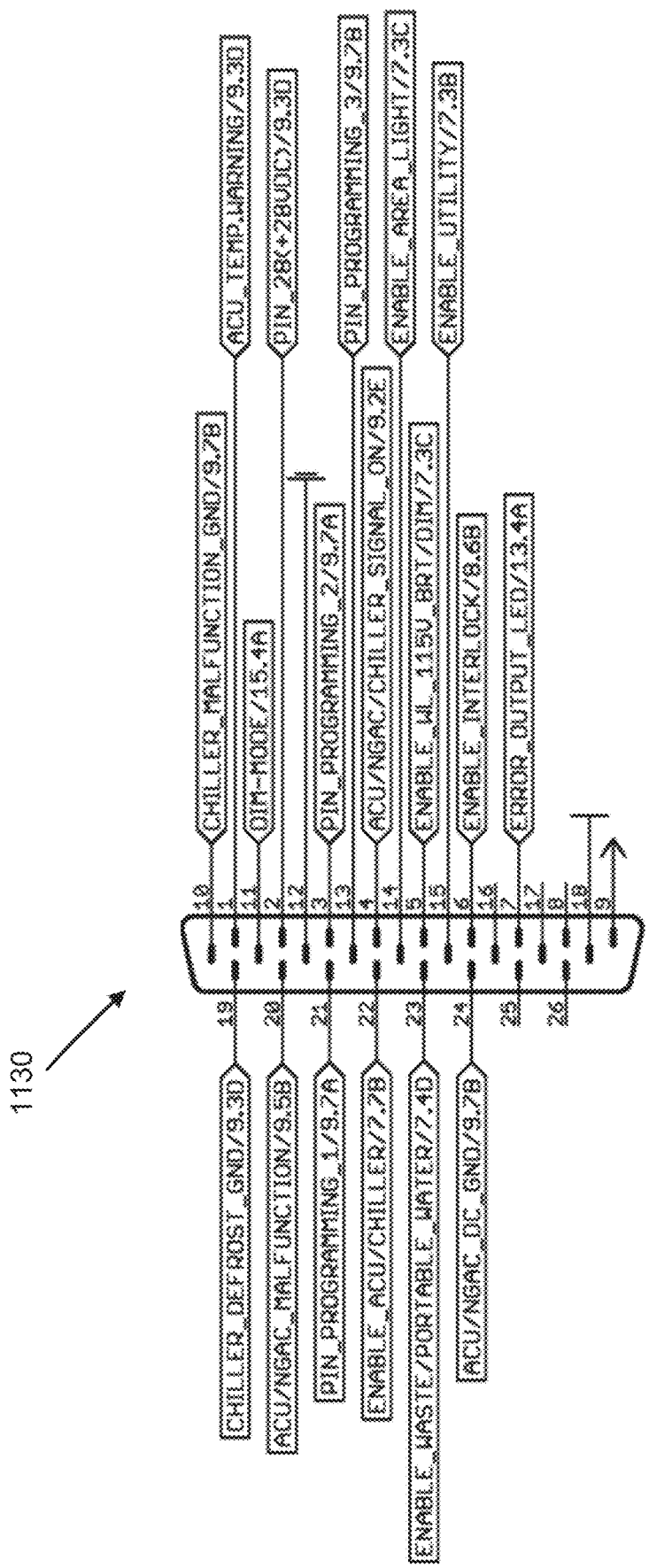
FIG. 11B illustrates a pin configuration of an insert signal connector on a galley insert side, according to some embodiments of the present disclosure.
Figure 11C:
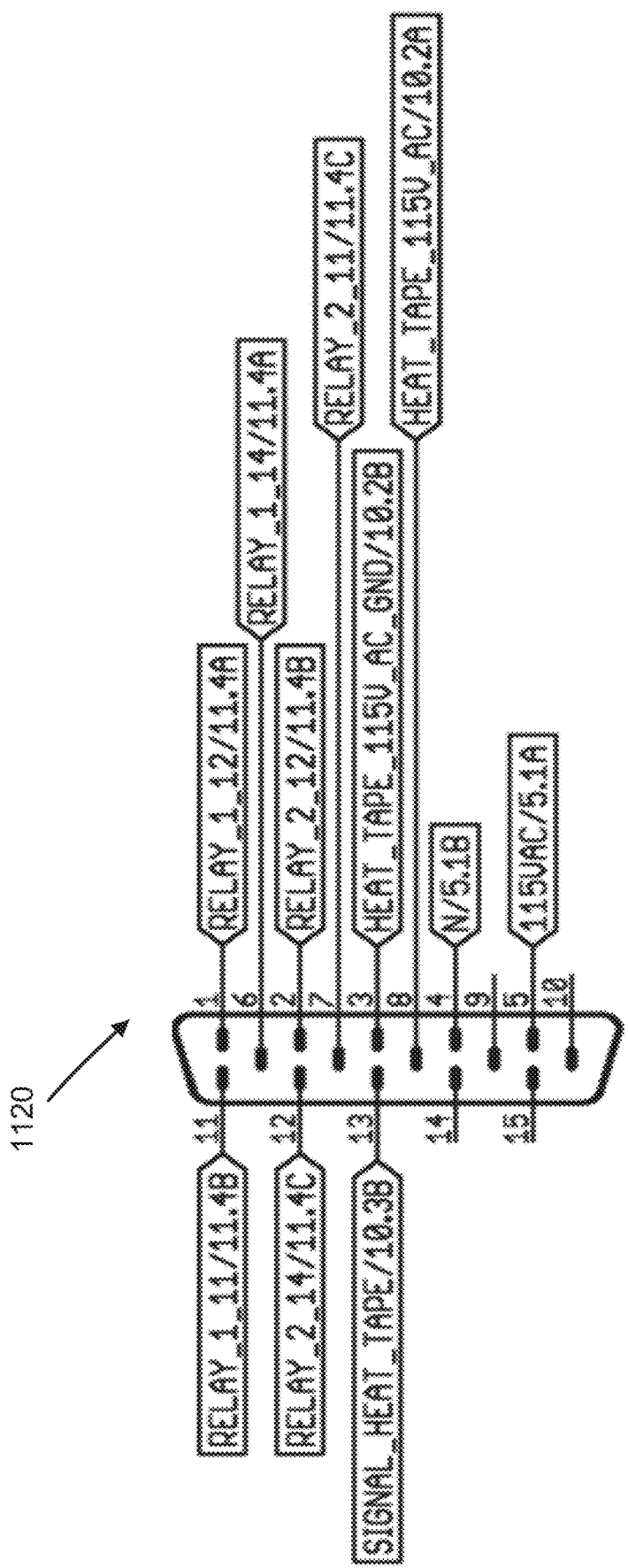
FIG. 11C illustrates a pin configuration of a power connector on a galley insert side, according to some embodiments of the present disclosure.
Figure 12B:
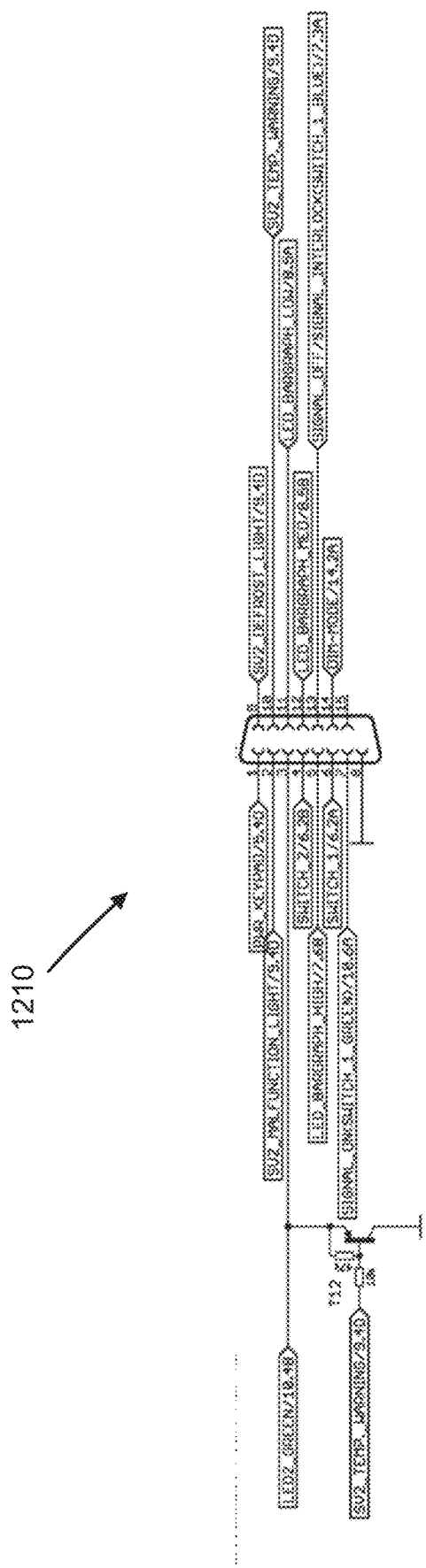
FIG. 12B illustrates a pin configuration of another keypad connector, according to some embodiments of the present disclosure.

FIG. 10B illustrates another example of a pin diagram for the control board 460 of FIG. 5B that is electrically and mechanically coupled to the keypad and connectors related to a galley insert (e.g., work area), according to some embodiments of the present disclosure. As shown, the control board 460 includes the insert signal interface 466 with a connection pin set associated with a galley insert plug (e.g., having pins as shown in FIG. 11B), the power connector interface 464 coupled with a power plug (e.g., having pins shown in FIG. 11C) to power the control board 460, and the keypad connector interface 410 coupled with another plug (e.g., having pins as shown in FIG. 12B). The insert signal pin set is numbered 4, 5, 6, 7, 11, and 12 that are configured for an area light. Once the control board 460 receives power supply via the power connector interface 464 and a galley insert (e.g., area light) is coupled, the control function within the control board 460 that correspond to the galley insert (e.g., the area light) are activated. Further, the keypad 500 is coupled to the control board 460 via a wire harness 1415 between the keypad interface 410 and the keypad connector 510. Once connected, the control board 460 can control the galley insert and signals can be sent and received via the insert signal pin set numbered 4, 5, 6, 7, 11, and 12.

A detailed pin configuration associated an insert signal connector 1130 compatible with a galley connector (e.g., 466/1430a) on a galley insert side is shown in FIG. 11B. A detailed pin configuration associated with a power connector 1120 compatible with a power connector interface (e.g., 466/1420a) on the galley insert side is shown in FIG. 11C. A detailed pin configuration associated with a keypad connector 1210 corresponding to a keypad connector interface (e.g., 410) is shown in FIG. 12B according to some embodiments of the present disclosure. These pin sets are provides for exemplary purposes only, and it should be understood that alternate pin configurations are possible and considered within the scope of this disclosure.

Figure 13A:
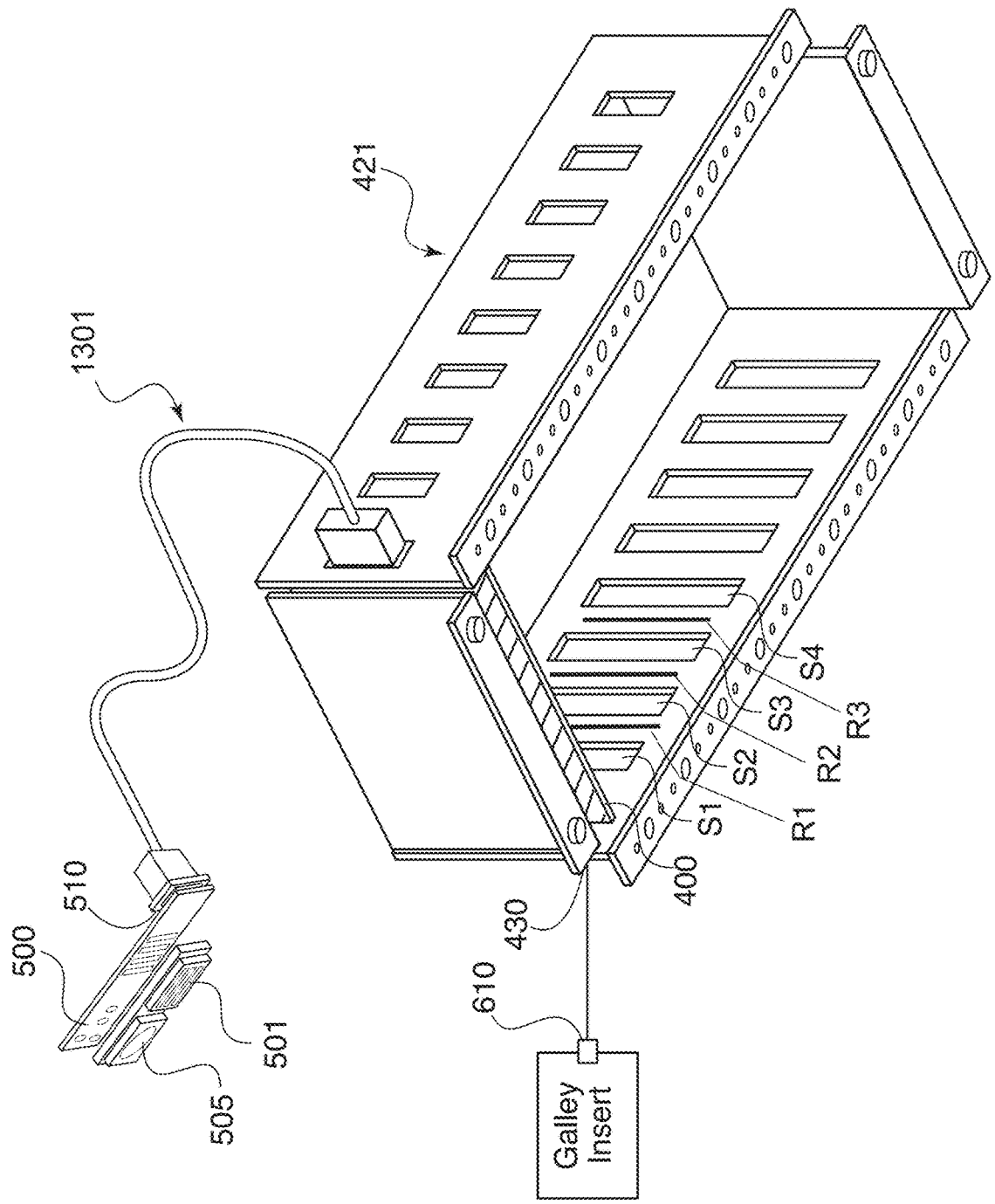
FIG. 13A illustrates a control module assembly housing of FIGS. 6A-6B configured to receive multiple control boards that are wire coupled to keypad control boards, according to some embodiments of the present disclosure.

FIG. 13A illustrates a partially disassembled view of the integrated electronic control system including a control module assembly housing of FIGS. 6A-6B configured to receive multiple control boards and further configured to electrically couple with the keypad control boards via a pigtail wire, according to some embodiments of the present disclosure. As shown in FIG. 13A, the integrated electronic control system includes at least one control board 400, at least one keypad 500, and a housing 421 having PCB rails R1, R2, R3, etc. (e.g., around slots S1-S4) configured to mount a plurality of control boards (e.g., instances of the control board 400) and keypads (e.g., 500a, 500b, 500c, in FIG. 8 etc.). As mentioned earlier, the control board 400 may include multiple circuits for executing control functions (e.g., 401, 403, 405, 407, and 409 in FIG. 4) of several galley inserts. For example, the control functions include, but not limited to, turning ON/OFF and dimming area lights or spot lights, turning ON/OFF interlocks, turning ON/OFF cooling elements and temperature selecting, turning ON/OFF heating elements and temperature selecting, turning ON/OFF of power, among other functions.

As shown in FIG. 13A, the PCB rails R1, R2, R3 are each configured to accept and mount a control board 400 such that their connection interfaces can be accessed through the rails S1-S4 (also see FIG. 6A-6B). For example, an insert side connection interfaces can be connected to galley inserts by connecting a first pigtail 1301 on one side, and a keypad side connection interfaces can be connected to the keypad by connecting a second pigtail 1302. The first pigtail 1301 may be attached with a connector (see FIG. 11A), and the second pigtail 1302 may be attached with another connector (see FIG. 12A). When a particular galley insert is coupled via the first pigtail 1301, the connector such as (in FIG. 11A) in cooperation with pin coding of the control board 400 recognizes the galley insert. Once the control board 400 recognizes the galley insert, the control board configures the keypad 500 to display the appropriate inputs to the user through the keypad display (e.g., as shown in FIG. 9A-9B).

Figure 13B:
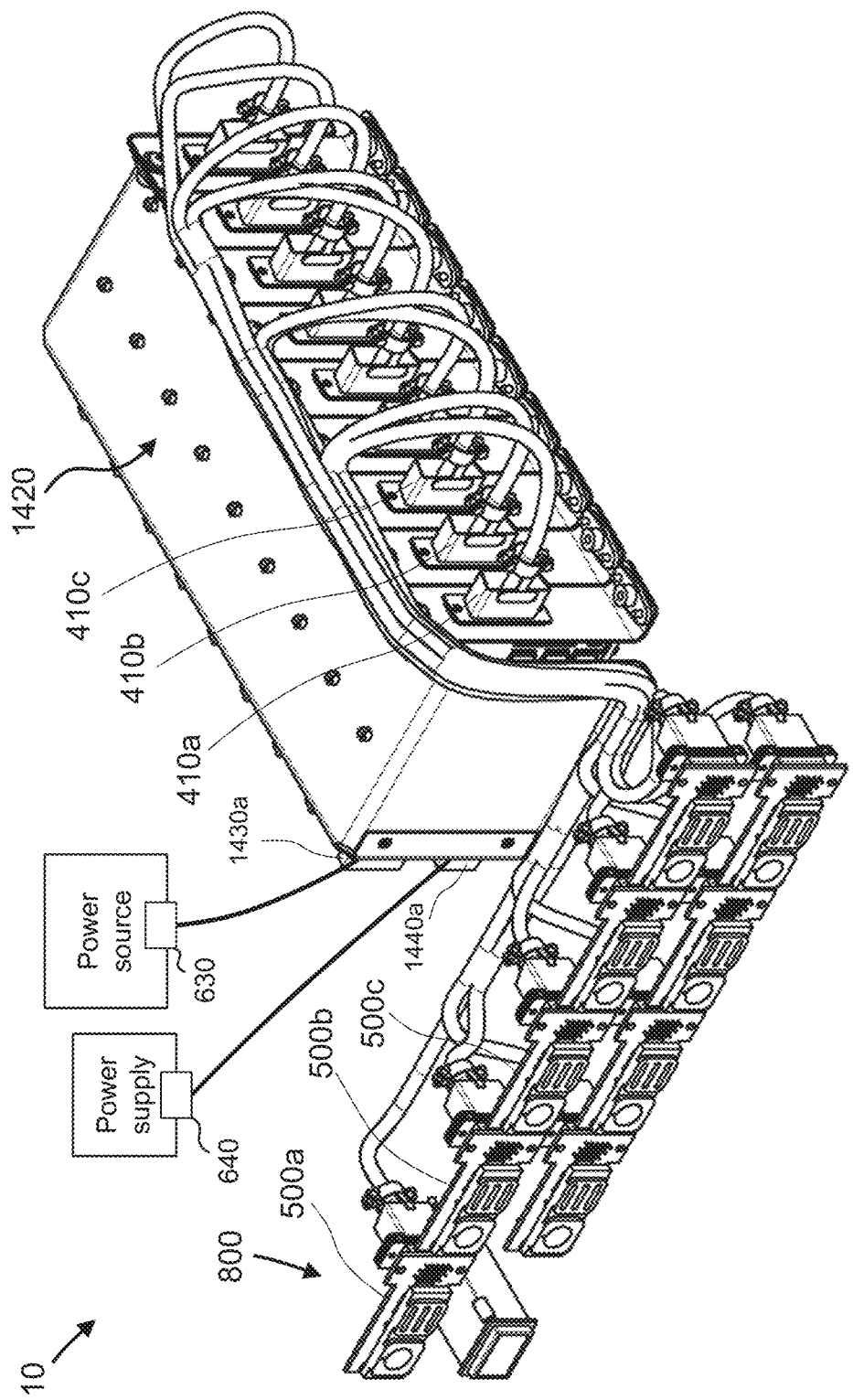
FIG. 13B illustrates a control module assembly housing of FIGS. 6C-6D configured to receive multiple control boards that are wire coupled to keypad control boards, according to some embodiments of the present disclosure.

FIG. 13B illustrates another example connections between the keypad 800, a power source, a galley insert, and the control board (e.g., 460) inside the control module 1420 using wire harness or pigtail. The keypad 800 may include a plurality of keypad boards 510a-510c as discussed with FIG. 8. A first keypad connector interface 410a of a control board (e.g., 460) may connected to the keypad interface 510a, a second keypad connector interface 410b of another control board (e.g., 460) may be connected to the keypad interface 510b, and a third keypad connector interface 410c of yet another control board (e.g., 460) may be connected to the keypad interface 510c. A power connector interface 1440a of the control board (e.g., 460) can be connected to a power supply connector 640 (e.g., an instance of the connector 1140) to power the control board. An insert signal interface 1430a of the control board can be connected to a galley insert via the connector 630 (e.g., an instance of the connector 1130).

The integrated electronic control system herein provides several advantages. For example, if there is a failure in one control board, it can be replaced by another control board, even if the replacement control board is from a different electrical insert and it controls a different function. Because the control boards are modular, and the control functions are selected based on pin programming, any single control board can be programmed to control functions multiple inserts so that an insert may be plugged into any single control board without being limited to a location within the galley. The integrated electronic control system provides a good deal of flexibility in terms of installation of different components as well. For example, control boards can be installed in any available slot in the PCB rail. Further, a keypad can be plugged into any of the control boards to control functions of different inserts.

The control functions implemented on the control board can be selected by connecting the PCB rail to an galley insert. After connecting, a circuitry on the control board configured to perform the functions associated with the plugged galley insert is activated based on the pin programming. The modular keypad includes the hardware to display any control function. Multiple keypads can be combined to provide multiple control functions for all of the standard electrical inserts that are installed in aircraft galleys.

As such, the integrated electronic control system herein facilitates freedom to customize a number and arrangement of functions that can be controlled for a galley insert. In addition, the controls for controlling the galley inserts can be placed in many different places on the galley, independent of the location of the inserts within the galley. For example, the keypad that controls a coffee maker located near a top of a galley can be placed at a location that is at waist level on the galley for easier access.

Figure 14:
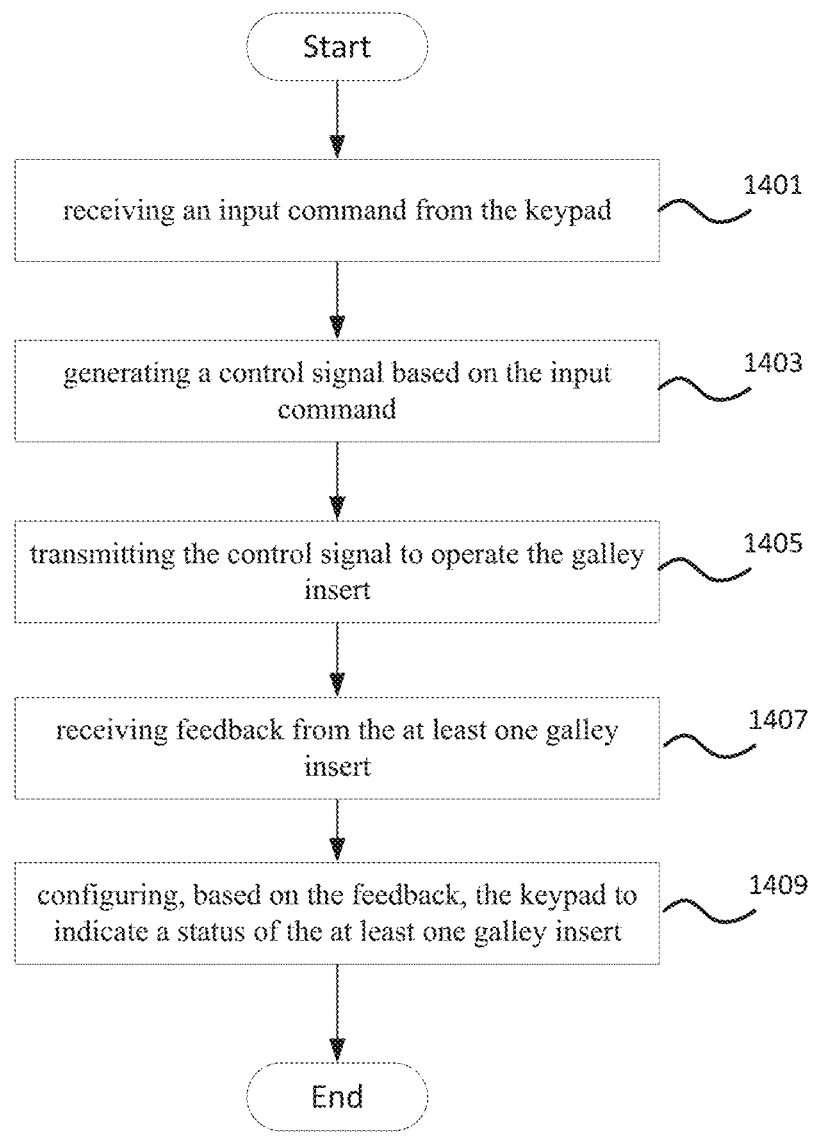
FIG. 14 is a flow diagram for controlling an insert using the integrated electronic control system of FIG. 4, according to some embodiments of the present disclosure.

FIG. 14 is a flow diagram for controlling an insert using an integrated electronic control system 10 of FIG. 4, according to some embodiments of the present disclosure. As discussed herein, an example integrated electrical panel system includes a keypad 500 and a control board 400 removably and electrically coupled to the keypad 500 and the galley insert. The control board 400 includes one or more processors implementing a plurality of control functions associated with multiple galley inserts.

Process 1401 involves receiving an input command from the keypad, wherein the keypad includes a plurality of control elements for controlling operations of the galley insert;

Process 1403 involves generating, via one or more processors of the control board and using a control function associated with the galley insert, a control signal based on the input command. The generating of the control signal involves recognizing, via the one or more processors, the galley insert to be controlled; activating one or more control functions associated with the galley insert; and configuring, via a display circuitry and based on the activated control functions, the keypad to display inputs associated with the galley insert. In some embodiments, the recognizing of the galley insert involves identifying a pin coding associated with the galley insert, wherein the pin coding is implemented via the one or more processors The configuring of the keypad involves configuring, via the display circuitry, the plurality of control elements to be displayed on a display for controlling the galley insert, and a plurality of indicators associated with the galley insert.

Process 1405 involves transmitting the control signal to the galley insert to operate the galley insert. In some embodiments, transmitting the control signal to the galley insert involves controlling, based on the input command, the galley insert selected from a bun warmer, a convection oven, a water heater, a beverage maker, a bar cart, an area light, or other galley insert. It can be understood that the present disclosure is not limited to a particular insert. In some embodiments, inserts within the galley area or other electrical equipment that can be coupled to the control board can controlled.

Process 1407 involves receiving feedback from the at least one galley insert. For example, the feedback may be information related to the galley insert controllable by the control board 400, operating mode, temperature, frequency of use, etc. In some embodiments, such feedback information may be used for predictive maintenance. For example, if a chiller is predicted to have a high likelihood of failure can be replaced or serviced by simply disconnecting from the control board 400. As such, no unnecessary complex rewiring to a toggle switch board (e.g., like in FIGS. 2 and 3) is necessary thereby simplifying the maintenance substantially.

Process 1409 involves configuring, based on the feedback, the keypad to indicate a status of the at least one galley insert. For example, as discussed with FIGS. 9A and 9B status indicator may be activated based on the feedback from the galley insert during operation. In some embodiments, the control board 400 may be coupled to a computer or may be configured to wirelessly transmit feedback information to a separate computer system for analyzing, or monitoring health of the galley insert or other electrical equipments.

The method may further include connecting the control board to an electrical interface to establish an electrical connection between the control board and the galley insert. Furthermore, a connector of the keypad can be aligned with another connector of the control board; and electrically coupling, via a pigtail, the keypad to the control board by the connectors.

In certain embodiments, a power management system including a power source (e.g., fuel cell) and a galley network controller (GNC) can be coupled to the integrated control panel herein. Examples of the power management system and GNC are discussed in U.S. Pat. No. 9,963,240, which is incorporated herein in its entirety by reference.

The various participants and elements in the previously described system diagrams (e.g., the system in FIG. 5A/5B) may use any suitable number of subsystems in the computer apparatus to facilitate the functions described herein. Examples of such subsystems or components are shown in FIG. 5A/5B. The subsystems or components shown in FIG. 5A/5B may be interconnected via the system bus or other suitable connection. In addition to the subsystems described above, additional subsystems such as a printer, keyboard, fixed disk (or other memory comprising computer-readable media), monitor, which is coupled to a display adaptor, and others are shown. Peripherals and input/output (I/O) devices (not shown), which couple to the control panel, can be connected to the system 10 by any number of means known in the art, such as a serial port. For example, the serial port or an external interface may be used to connect the control system 10 to a wide area network such as the Internet, a mouse input device, or a scanner. The interconnection via the system bus allows a processor (e.g., processor of a control board 400 and/or a display circuit of a keypad 500) to communicate with each subsystem and to control the execution of instructions from a system memory or the fixed disk, as well as the exchange of information between subsystems. The system memory and/or the fixed disk may embody a computer-readable medium.

The software components or functions described in this disclosure may be implemented via programming logic controllers ("PLCs"), which may use any suitable PLC programming language. In other embodiments, the software components or functions described in this disclosure may be implemented as software code to be executed by one or more processors using any suitable computer language such as, for example, Java, C++ or Perl using, for example, conventional or object-oriented techniques. The software code may be stored as a series of instructions or commands on a computer-readable medium, such as a random access memory ("RAM"), a read-only memory ("ROM"), a magnetic medium such as a hard-drive or a floppy disk, an optical medium such as a CD-ROM, or a DNA medium. Any such computer-readable medium may also reside on or within a single computational apparatus, and may be present on or within different computational apparatuses within a system or network.

The system herein can be implemented in the form of control logic in software or hardware or a combination of both. The control logic may be stored in an information storage medium as a plurality of instructions adapted to direct an information processing device to perform a set of steps disclosed in embodiments of the present disclosure. Based on the disclosure and teachings provided herein, a person of ordinary skill in the art will appreciate other ways and/or methods to implement the systems and methods.

In embodiments, any of the entities described herein may be embodied by a computer that performs any or all of the functions and steps disclosed.

The foregoing is provided for purposes of illustrating, explaining, and describing embodiments of the present disclosure. Further modifications and adaptations to these embodiments will be apparent to those skilled in the art and may be made without departing from the scope or spirit of the present disclosure. As one example, instead of a fuel cell system, another suitable power source that is independent from the aircraft's main power system may be used.

That which is claimed is:

1. An integrated electronic control system comprising:
a keypad including a plurality of control elements and a keypad connector;
at least one galley insert including a galley insert connector and controllable by a control element of the plurality of control element of the keypad; and
a control board comprising:
a first connector configured to removably and electrically couple with the keypad connector of the keypad, wherein the first connector of the control board comprises a first set of electrical connections configured to electrically couple the keypad via the keypad connector to the control board;
a second connector configured to removably and electrically couple with the galley insert connector of the at least one galley insert, wherein the second connector of the control board comprises a second set of electrical connections to electrically couple the at least one galley insert for transmitting control signals from the one or more processors to the at least one galley insert; and
one or more processors implementing a plurality of control functions related to multiple galley inserts, the one or more processors being in communication with the keypad and the at least one galley insert when the control board, the keypad and the at least one galley insert are electrically coupled to each other by the first and second connectors, respectively,
wherein the one or more processors is configured to:
receive an input command associated with the at least one galley insert from a control element of the plurality of control elements of the keypad;
generate a control signal, via a control function associated with the at least one galley insert using the input command, to control the at least one galley insert;
receive feedback from the at least one galley insert; and
configure, based on the feedback, the keypad to indicate a status of the at least one galley insert.

2. The integrated electronic control system of claim 1, wherein the keypad comprises a first area having a first set of control elements dedicated to a first galley insert, and a second area having a second set of control elements dedicated to a second galley insert.

3. The integrated electronic control system of claim 2, wherein the keypad comprises a display circuitry and a display panel configured with the plurality of control elements, the display panel covering the display circuitry.

4. The integrated electronic control system of claim 3, wherein the display circuitry communicates with the one or more processors of the control board through the keypad connector, wherein the one or more processors of the control board is configured to:

recognize the at least one galley insert to be controlled; and configure the keypad to display the control elements to a user through the keypad display.

5. The integrated electronic control system of claim 1, wherein the one or more processors of the control board is configured to recognize the at least one galley insert based on a pin coding of the control board, and activate one or more control functions associated with the at least one galley insert.

6. The integrated electronic control system of claim 1, further comprising:

a control module housing configured to receive a plurality of control boards that includes the control board, wherein each control board of the plurality of control boards is connectable to a keypad by a pigtail at one end and is connectable to a galley insert by another pigtail at other end.

7. The integrated electronic control system of claim 1, wherein the at least one galley insert comprises a bun warmer, a convection oven, a water heater, a beverage maker, a bar cart, or an area light.

8. A method of operating a galley insert via an integrated electrical panel system comprising a keypad and a control board removably and electrically coupled to the keypad and the galley insert using a first connector and a second connector, wherein the first connector is configured to removably and electrically couple with a keypad connector of the keypad, wherein the first connector comprises a first set of electrical connections configured to electrically couple the keypad via the keypad connector to the control board, wherein the second connector of the control board comprises a second set of electrical connections to electrically couple the galley insert for transmitting control signals from the one or more processors to the galley insert, the control board comprising one or more processors implementing a plurality of control functions associated with multiple galley inserts, the method comprising:

receiving an input command from the keypad, wherein the keypad includes a plurality of control elements for controlling operations of the galley insert;

generating, via one or more processors of the control board and using a control function associated with the galley insert, a control signal based on the input command;

transmitting the control signal to the galley insert to operate the galley insert;

receiving feedback from the galley insert; and configuring, based on the feedback, the keypad to indicate a status of the galley insert.

9. The method of claim 8, wherein transmitting the control signal to the galley insert comprises:

controlling, based on the input command, the galley insert selected from a bun warmer, a convection oven, a water heater, a beverage maker, a bar cart and an area light.

10. The method of claim 8, further comprises:

connecting the control board through a first electrical interface to establish an electrical connection between the control board and the keypad; and connecting the control board through a second electrical interface to establish an electrical connection between the control board and the galley insert.

11. The method of claim 8, wherein generating the control signal comprises:

recognizing, via the one or more processors, the galley insert to be controlled;

activating one or more control functions associated with the galley insert; and configuring, via a display circuitry and based on the activated one or more control functions, the keypad to display inputs associated with the galley insert.

12. The method of claim 11, wherein configuring the keypad comprises:

configuring, via the display circuitry, the plurality of control elements to be displayed on a display for controlling the galley insert, and a plurality of indicators associated with the galley insert.

13. The method of claim 11, wherein recognizing the galley insert:

identifying a pin coding associated with the galley insert, wherein the pin coding is implemented via the one or more processors.

\* \* \* \* \*